United States Patent [19]

Morikawa et al.

[11] Patent Number: 5,042,079
[45] Date of Patent: Aug. 20, 1991

[54] METHOD OF RECORDING/REPRODUCING DATA OF MESH PATTERN, AND APPARATUS THEREFOR

[75] Inventors: Shigenori Morikawa, Kokubunji; Takeshi Matsuoka, Kawasaki; Hiroshi Chikakiyo, Fussa, all of Japan

[73] Assignee: Casio Computer Co., Ltd., Tokyo, Japan

[21] Appl. No.: 389,287

[22] Filed: Aug. 3, 1989

[30] Foreign Application Priority Data

Aug. 12, 1988 [JP] Japan .................. 63-200225
Aug. 12, 1988 [JP] Japan .................. 63-200226
Aug. 12, 1988 [JP] Japan .................. 63-200227
Dec. 19, 1988 [JP] Japan .................. 63-163430[U]

[51] Int. Cl.⁵ .................................. G06K 9/00
[52] U.S. Cl. ............................... 382/58; 382/9; 382/22; 382/48
[58] Field of Search ............... 382/13, 9, 22, 23, 30, 382/58, 48

[56] References Cited

U.S. PATENT DOCUMENTS 4,228,716 10/1980 Linford .
4,422,361 12/1983 Ishii et al. .
4,437,378 3/1984 Ishida et al. .
4,464,966 8/1984 Ishida .
4,589,144 5/1986 Namba .................. 382/61
4,783,838 11/1988 Matsunawa .
4,788,598 11/1988 Ochi et al. .
4,797,940 1/1989 Sato et al. .................. 382/9

FOREIGN PATENT DOCUMENTS

A13546136 6/1986 Fed. Rep. of Germany .
A13636675 4/1987 Fed. Rep. of Germany .

Primary Examiner—David K. Moore
Assistant Examiner—Daniel Santos
Attorney, Agent, or Firm—Frishauf, Holtz, Goodman & Woodward

[57] ABSTRACT

A data reading apparatus reads data of dots from a recording sheet on which data is recorded in the form of a mesh pattern, and decodes the read data into binary data. The data reading apparatus has an image sensor to read black/white levels of dots of the mesh pattern using the image sensor and to binarize the read levels by a hardware component or CPU processing according to software. An image can have a high recording density by minimizing a dot size.

6 Claims, 20 Drawing Sheets

FIG. 8B  MEMORY DATA

4 DOTS FOR 1 BIT

⎫
  ⎬ "0" PATTARN

⎫
  ⎬ "1" PATTARN

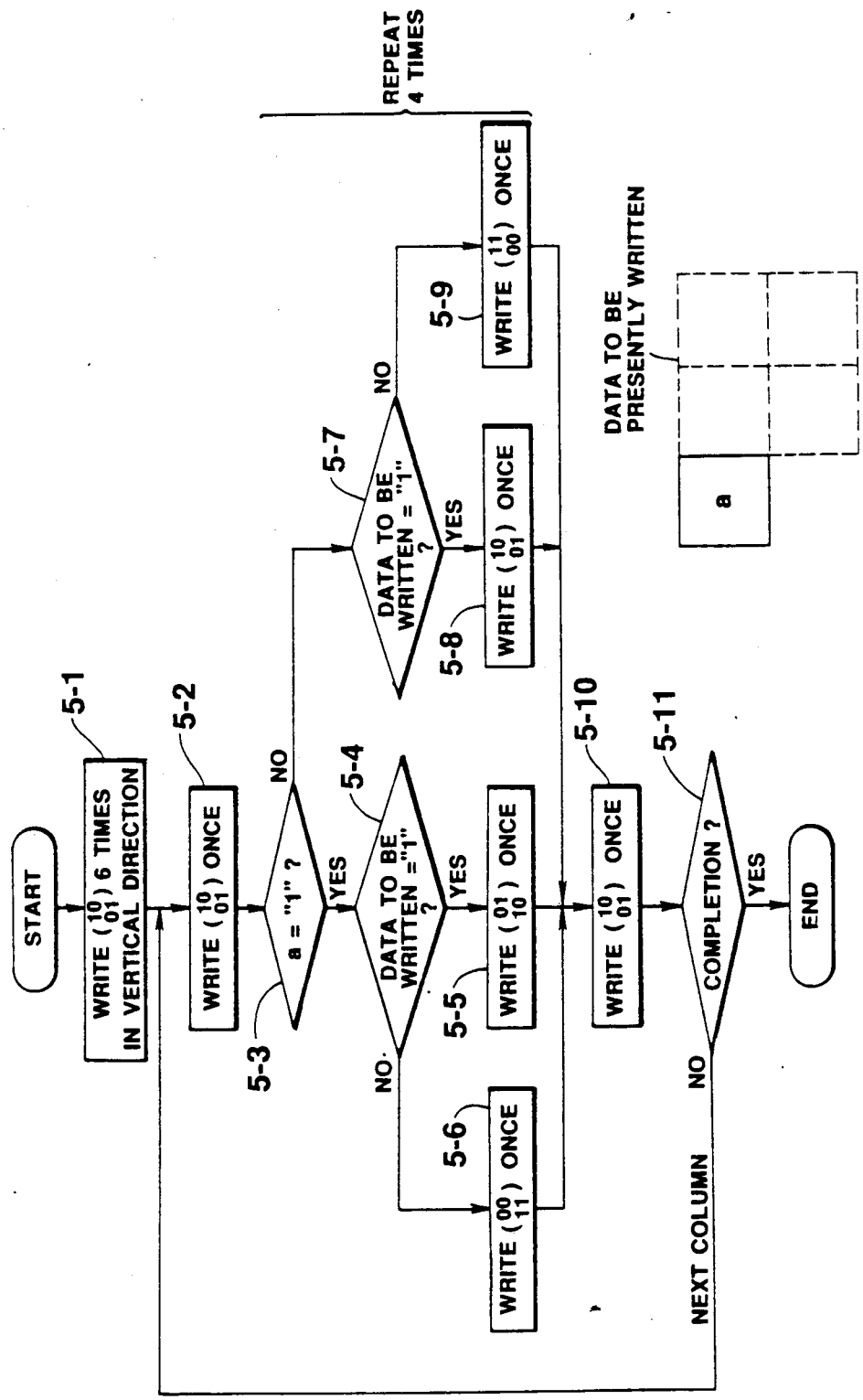

FIG. 23A SCAN START a

FIG. 23B ADDRESS RESET b
1 MAIN SCAN LINE

FIG. 23C CLOCK c

FIG. 23D ANALOG SIGNAL d
THRESHOLD LEVEL VOLTAGE
BAR PORTION
$V_L$
$V_H$
EFFECTIVE DATA PERIOD

FIG. 23E SAMPLE-HOLD OUTPUT SIGNAL e
THRESHOLD LEVEL VOLTAGE

FIG. 23F DIGITAL SIGNAL f
WHITE BLACK WHITE BLACK WHITE BLACK WHITE

METHOD OF RECORDING/REPRODUCING DATA OF MESH PATTERN, AND APPARATUS THEREFOR

BACKGROUND OF THE INVENTION

1. Field of the Invention

The present invention relates to a data recording/reproducing system for encoding binary data to record the encoded data as an image and for reading the recorded image and decoding the read image into binary data.

2. Description of the Related Art

A bar code technique is known as a technique for reading an encoded image from a recording medium (recording sheet) and reproducing binary data.

For example, the technique is disclosed in U.S. Pat. Nos. 4,422,361, 4,437,378, and 4,464,966. However, the bar code is not suitable for inputting a large volume of data since it is difficult to increase a recording density of bar codes in terms of their specific format.

Published Unexamined Japanese Patent Application No. 53-73026 discloses a technique wherein an image constituted by some black dots and the remaining white dots of an i×j (e.g., 3×3) matrix is read to recognize a black-and-white mesh pattern. The data volume of the matrix encoded image can be increased by increasing the number of dots included in the matrix. However, in the above patent application, in order to recognize the black-and-white mesh pattern, software is used. For this reason, the technique requires a considerable time to recognize a pattern, and a pattern reading apparatus becomes expensive. A data recording technique using a similar matrix image is also described in "Dump List Read by Image Scanner", I/O, May 1988, pp. 121 to 125.

SUMMARY OF THE INVENTION

It is therefore an object of the present invention to provide a data reading apparatus which can easily and quickly read and recognize encoded image data having a relatively high recording density.

It is another object of the present invention to provide a data reading apparatus which can eliminate problems caused when encoded image data is sequentially input (e.g., in units of scan lines) using a hand-held image scanner or the like, e.g., a problem of a data recognition error caused by a change in scanning speed, direction, or the like.

Therefore, a data reading apparatus according to an aspect of the present invention uses, as a recording medium of an encoded image, a recording sheet on which an image including a mesh pattern obtained by encoding data using black and white dots selectively formed in a matrix form. The image includes a first mark (A-1, A-2) for indicating a data sampling position of the mesh pattern in the vertical direction (e.g., a main scan direction), and a second mark for indicating a data sampling position of the mesh pattern in the horizontal direction (e.g., a sub-scan direction). The data reading apparatus comprises image sensor means (1) for reading the image on the recording sheet, and also comprises, as hardware means for recognizing the black and white dots, vertical sampling position calculating circuit means (2-1-2-9, G4) for detecting the first mark to calculate the vertical data sampling position, horizontal sampling position calculating circuit means (FF3, ROM2, 9-1, 9-2) for detecting the second mark from the read image data to calculate the horizontal data sampling position, and data sampling circuit means (3, G6, 9-5) for sampling image data at a sampling position defined by the vertical and horizontal calculated data sampling positions.

The image can have a high recording density by minimizing the dot size. The image (black and white dots) can be recognized in a short period of time since recognition is performed by hardware means for detecting a sampling point and sampling data at the detected sampling point.

The first mark can have various forms. For example, the first mark is constituted by a pair of bars (A-1, A-2) extending along upper and lower sides of the mesh pattern. In this case, the vertical sampling position calculating circuit means comprises interval measuring circuit means (2-1, 2-3, 2-4) for measuring an interval of the pair of bars included in the read image data, and dividing circuit means (2-5, 2-9, G4) for calculating a position obtained by substantially (almost) equally dividing the measured interval of bars as the vertical data sampling position According to this aspect, when the image sensor means (1) obliquely reads an image (EI) on the recording sheet, a correct vertical data sampling position can be detected. This is because the read image is merely inclined, and the relative positional relationship between the pair of bars (A-1, A-2) and the mesh pattern (MP) can be maintained. The interval between the pair of bars (A-1, A-2) when it is measured in a direction perpendicular to the bars is changed from a value obtained when it is measured in a direction not perpendicular to the bars. However, the change rate is equal to that when an interval between upper and lower sides of a dot is measured. Therefore, an interval between sampling points obtained by the dividing circuit means (2-5-2-9, G4) corresponds to an interval between vertically adjacent dots.

As another first mark, a specific pattern array may be combined in the mesh pattern. For example, a dot array in which black and white dots alternately appear is arranged adjacent to a given column of the mesh pattern to be shifted by half a dot. When data is read, edges of this specific pattern, i.e., change positions from a white dot to a black dot or from a black dot to a white dot are detected. Each detected position represents the vertical data sampling position.

The image sensor means can be of a line type. The image sensor means reads image data for one scan line at a time (image data for a substantially vertical line) while scanning (moving along) the recording sheet from one side toward the other side of the mesh pattern. When the line image sensor means is used, image data at horizontal data sampling positions are line image data supplied from the image sensor at a given timing. Detection of horizontal sampling timings is equivalent to detection of horizontal data sampling positions. Therefore, in this aspect, a boundary between horizontally adjacent black and white dots (vertical boundary) included in the mesh pattern is used as the second mark. Thus, the horizontal sampling position calculating circuit means comprises dot boundary detecting means (FF3, 9-2) for detecting the boundary, and circuit means (9-1, ROM2) for detecting a timing corresponding to the lapse of a predetermined period of time after the boundary is detected by the detecting means as a timing of the horizontal data sampling position.

The predetermined period of time is constant as long as the horizontal scanning (manually or mechanically moving) speed of the line image sensor means is constant. However, if the predetermined period of time is used when the scanning speed varies, the horizontal sampling position is offset from the center of each dot, and wrong data may be sampled.

In this aspect, horizontal speed detecting circuit means (14-3, 14-4) for detecting the scanning speed of the image sensor means for scanning the mesh pattern in the horizontal direction is used. The horizontal sampling position calculating circuit means (14-5–14-11) calculates the horizontal data sampling position on the basis of the detected scanning speed and a boundary position of horizontally adjacent dots. The horizontal speed detecting circuit means can comprise a rotary encoder.

In another arrangement for compensating for a variation in moving speed of the line type image sensor (1), the mesh pattern includes at least a row of a specific pattern in which black and white dots alternately appear. In order to detect the horizontal sampling position of each dot, there are arranged boundary detecting circuit means (FF5, 14-1) for detecting a boundary between two adjacent black and white dots in each row of the mesh pattern, horizontal scanning speed detecting circuit means (14-3, 14-4) for measuring a time between boundaries detected by the boundary detecting circuit means (FF5, 14-1) to detect a horizontal scanning speed of the image sensor means, and horizontal sampling position calculating circuit means (14-5–14-11) for calculating a horizontal sampling position of each dot in the mesh pattern on the basis of the timing of the boundary detected by the boundary detecting circuit means and the scanning speed detected by the horizontal scanning speed detecting circuit means.

A another second mark for indicating the horizontal data sampling position of the mesh pattern, specific pattern of black and white dots which alternately appear may be arranged between adjacent rows of the mesh pattern to be shifted by half a dot. When data is read, a change point from a white dot to a black dot or from a black dot to a white dot is detected. A position detected for the specific pattern of a given row is used as a horizontal data sampling position of the adjacent row in the mesh pattern. In this case, circuit means for detecting a black/white change position (boundary) for a row other than the row of the specific pattern can be omitted.

Data sampling is preferably performed as follows to save a storage capacity. That is, data at vertical sampling positions are extracted from image data from the image sensor means and are temporarily stored, other data are abandoned, and data at horizontal sampling positions are then extracted from the vertical sampling data.

When an image is encoded using a mesh pattern in which black and white dots are selectively formed, a dot size is set to be an allowable minimum size, thus allowing information recording at a considerably high density. Such image recognition can be performed by identifying black and white dots in the mesh pattern.

Therefore, in order to correctly reproduce binary data, black and white dots need only be correctly recognized. However, in practice, some obstacles against correct recognition of black and white dots are encountered.

One obstacle is associated with unstable characteristics of an image sensor. Each element of an image sensor converts an amount of incident light according to lightness of an image into a voltage. When incident light components corresponding to white or black dots are continuously input, a voltage level of a sensor output is changed. This means that there is no specific threshold voltage for distinguishing two levels, i.e., black and white levels of an image sensor outputs, and causes a recognition error of black and white dots.

When a mesh pattern itself recorded on a data recording medium includes defects, it is basically difficult to identify black and white dots.

It is still another object of the present invention to provide a data reading apparatus for reading data from a mesh pattern obtained by encoding an image, which can improve a recognition rate of black and white dots and can reproduce correct data if some dots are erroneously recognized.

It is still another object of the present invention to provide a data recording medium suitable for the data reading apparatus of this type.

In order to achieve the above objects, a mesh pattern in which a 1-bit encoded image is expressed by a black-and-white pattern of a predetermined number of dots and boundaries between black and white dots are almost uniformly distributed is recorded as an encoded image on a data recording medium according to one aspect of the present invention.

This arrangement is effective to improve a recognition rate of the data reading apparatus. Since the boundaries between black and white dots are almost uniformly distributed in a mesh pattern, an image sensor output corresponding to a white pixel and an image sensor output corresponding to a black pixel have clearly different values. Thus, black and white dots in the mesh pattern can be correctly recognized. Since a 1-bit encoded image is expressed by a black-and-white pattern of the predetermined number of dots, even if these dots include some erroneously recognized dots, an original black-and-white pattern can be easily estimated, and hence, correct data can be reproduced.

More specifically, an image reading apparatus according to another aspect of the present invention causes image sensor means (1) to read image data on the data recording medium, and causes dot state identification means (4) to identify black and white dots constituting each 1-bit encoded image. Data decoding means (4) compares black and white dots constituting each 1-bit encoded image identified by the dot state identification means with a predetermined reference pattern to decode the image into bit data. Therefore, even if some of a plurality of dots constituting the 1-bit encoded image are erroneously recognized, bit data which is likely to be correct can be obtained, and a data recognition rate can be improved It is still another object of the present invention to provide a binary data recording method and apparatus with which a user can desirably perform the above-mentioned data printing and recording using the mesh pattern.

It is still another object of the present invention to provide a binary data recording/reproducing method and apparatus with which the above-mentioned recording using the mesh pattern can be performed, and a recorded encoded image can be decoded to binary data with a high recognition rate.

In the binary data recording method and apparatus according to still another aspect of the present invention, in order to record such an image on a data recording medium, each bit of binary data is converted into one or a plurality of encoded bits (data representing a black/white dot in a 1-bit encoded image), and the converted encoded bits are printed while being two-dimensionally arranged on a data recording medium as black or white dots according to their values. In order to reproduce binary data from an image on the data recording medium, in the binary data recording/ reproducing method and apparatus of the present invention, the image on the data recording medium is read, and black and white dots constituting each 1-bit encoded image in the mesh pattern are identified on the basis of the read image data, and the identification result is compared with a predetermined reference pattern, thus decoding the image into bits of binary data.

It is still another object of the present invention to provide a data reading apparatus which can accurately binarize an image converted to an analog electrical signal, and can read data from a recording medium which suffers from a variation in color density.

In order to achieve the above object, according to still another aspect of the present invention, an average value of analog signals of an image in one scan line supplied from image sensor means (101) is calculated, and analog signals of an image in the next line from the image sensor means (101) are binarized on the basis of the calculated average value.

In this case, the average value represents an average value of signal levels of analog signals of an image adjacent to an image to be binarized. Therefore, even if a background color or a data color on a recording medium is locally changed, a recorded image can be relatively accurately read.

According to still another aspect of the present invention, an image on a recording medium includes a known pattern. A threshold level for binarization is determined so that data binarized by binarizing means (104) includes data which coincides with the known pattern (21).

This arrangement is based on the principle that if a known pattern (21) distributed in an image on a recording medium can be accurately obtained as binary data unknown image data recorded on the recording medium can also be correctly binarized.

According to still another aspect of the present invention, an average value of analog electrical signals of an image for one scan line in the main scan direction is used as an initial value of a binarization threshold level. On the other hand, an image recorded on a recording medium includes black and white bars (21), a ratio of widths of which is known, along the subscan direction. A ratio of widths of black and white bars is measured on the basis of data obtained by binarizing analog electrical signals in the present line by the present value of the threshold level. According to the measurement result, the present value of the threshold level is corrected, and the corrected value is used as a threshold level for binarizing analog electrical signals of an image in the next line.

BRIEF DESCRIPTION OF THE DRAWINGS

Other objects and features of the present invention will be obvious for those who are skilled in the art from the description of preferred embodiments of the present invention taken in conjunction with the accompanying drawings, in which:

FIGS. 8A and 8B show image data to be sampled by the control circuit unit;

FIG. 19B is a flow chart of data encoding executed by the CPU;

FIG. 19C is a view for explaining a data encoding operation;

FIGS. 23A to 23F are timing charts of signals of respective sections of the data reading apparatus shown in FIG. 20.

DETAILED DESCRIPTION OF THE PREFERRED EMBODIMENTS

Some embodiments of the present invention will now be described with reference to the accompanying drawings.

(First Embodiment)

An embodiment in which the present invention is applied to inputting of performance data of an electronic musical instrument will be described below.

Figure 1:
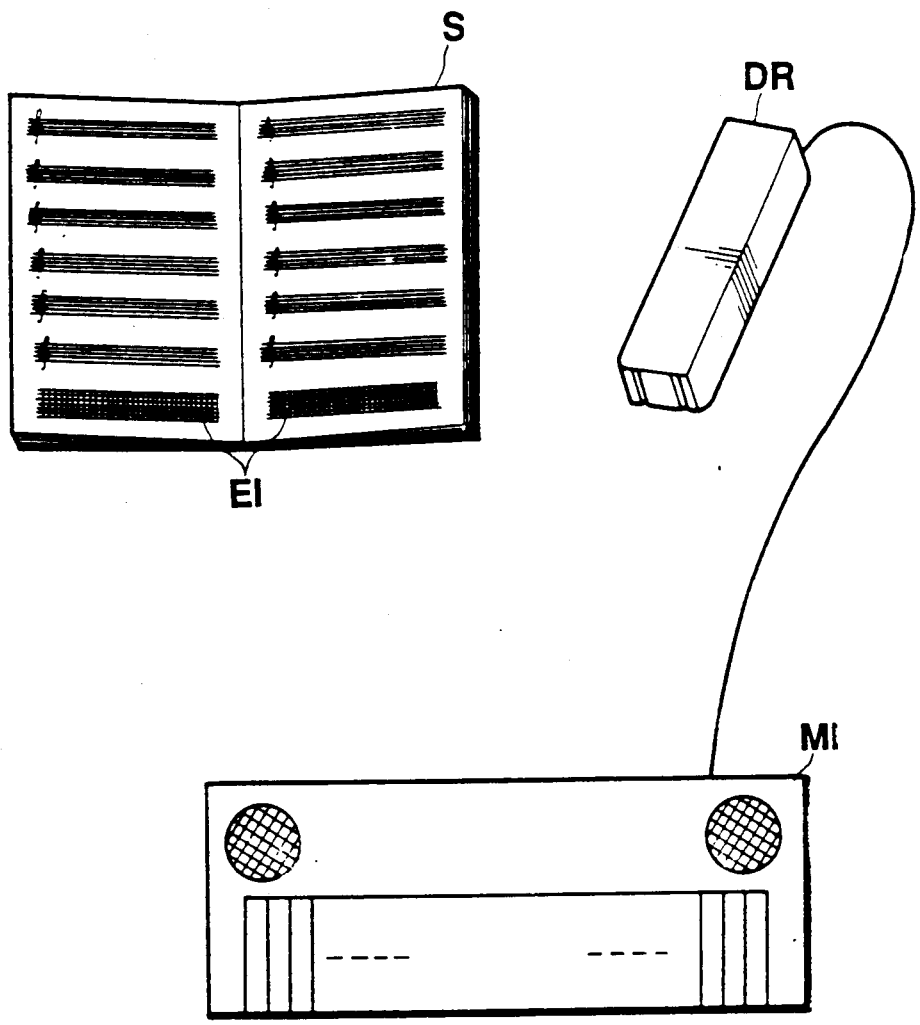
FIG. 1 schematically shows the overall arrangement when the present invention is applied to an input section of performance data of an electronic musical instrument.

FIG. 1 is a schematic view showing the overall electronic musical instrument according to this embodiment. An image EI obtained by encoding performance data (music score data) is printed at a high density on a margin of a music score S. A data reading apparatus DR scans the music score data image EI to read it. The apparatus DR transfers the read data to an electronic musical instrument MI. The musical instrument MI makes a performance according to the received data.

Figures 2, 3A, 3B, 3C:
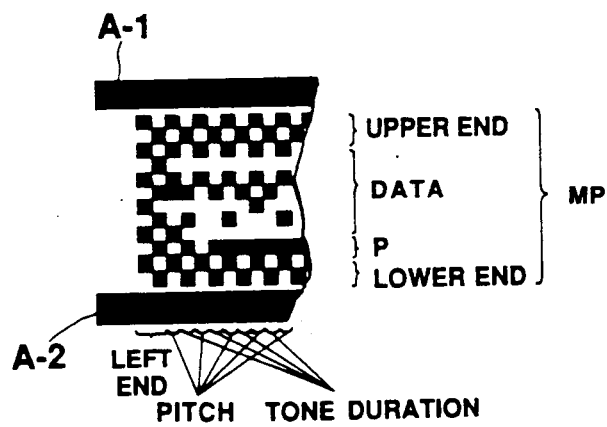
FIG. 2 shows an encoded image of a music score recorded on a recording sheet.
FIGS. 3A to 3C show code systems associated with notes of a music score.

FIG. 2 shows an example of the encoded image EI. As shown in FIG. 2, the encoded image EI has a mesh pattern MP having a rectangular shape, and each dot is set to be white (□) or black (■). Upper and lower bars A-1 and A-2 are printed al upper and lower sides of the mesh pattern MP. The pair of bars A-1 and A-2 are utilized to determine sampling points of the mesh pattern MP in the vertical direction of the drawing. Two columns at the "left end" of the mesh pattern MP form a checker pattern, and two rows at each of the "upper end" and "lower end" of the mesh pattern MP also form a checker pattern. These checker patterns indicate ends of the mesh pattern MP. In this embodiment, the number of rows of the mesh pattern MP is 12. Therefore, 8 rows other than the two rows each at the upper and lower ends serve as a data area (area decoded by the data reading apparatus DR). In the data area, one note is expressed by two columns, and black-and-white patterns at odd-numbered columns from the left represent pitch data. Of the black-and-white patterns at the odd-numbered columns, the black-and-white pattern of three dots from the upper end represents an octave code (OC), the black-and-white pattern of the following four dots represents a scale or note code (SC), and an eighth black or white dot represents a parity. Black-and-white patterns at even-numbered columns represent tone durations. Of the black-and-white patterns at the even-numbered columns, the black-and-white pattern of seven dots from the upper end represents a time code TC, and an eighth dot represents a parity code. FIGS. 3A to 3C show code systems when a black dot is "1" and a white dot is "0".

Figure 4:
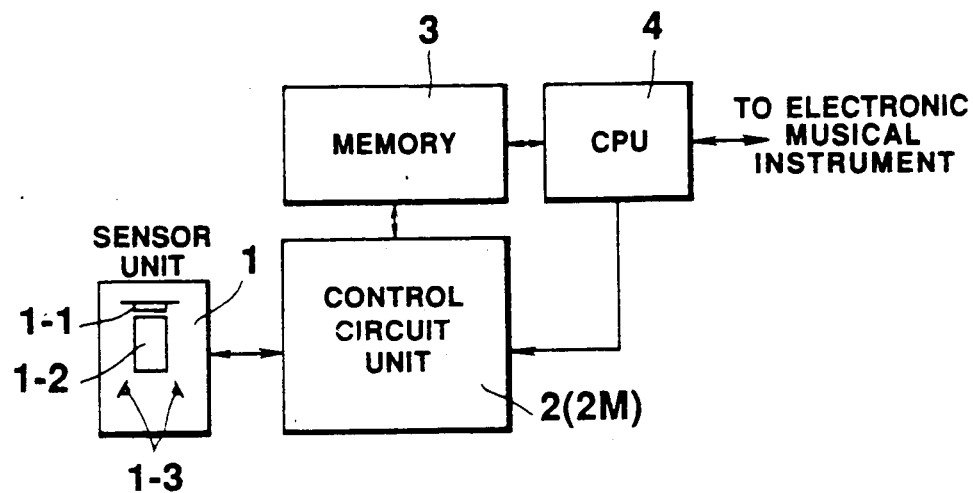
FIG. 4 is a block diagram showing the overall arrangement of a data reading apparatus according to a first embodiment of the present invention.
Figure 5:
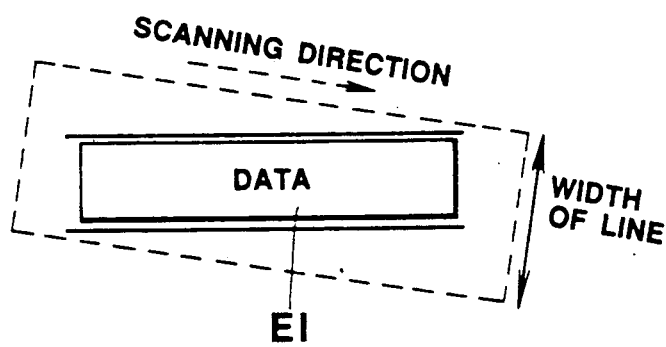
FIG. 5 is a view for explaining a line width of a sensor unit and a scan direction.

FIG. 4 shows the overall arrangement of the data reading apparatus. In FIG. 4, a sensor unit 1 reads image data, and sends the read image data to a control circuit unit 2. The control circuit unit 2 converts each dot of the image data into data representing a black/white state of each dot, and writes the converted data into a memory 3. A CPU 4 reads out data stored in the memory 3, converts readout data into corresponding application data (in this case, performance data), and transfers it to an external apparatus (in this case, the electronic musical instrument). The sensor unit 1 includes a proximity type line image sensor. The line image sensor radiates light on an image using an LED array 1-3, receives light reflected by the image by a sensor element array 1-1 through a rod lens array 1-2, and converts it into an electrical signal. The line width of the sensor unit 1 is determined according to an operation condition. In general, when the sensor unit 1 is scanned from the left end toward the right end of the encoded image EI, the line width is determined so that the entire encoded image can be read even if it is scanned while being inclined at a maximum inclination angle, as shown in FIG. 5. In FIG. 5, a portion surrounded by dotted lines is read by the sensor unit 1 as image data.

The memory 3 and the CPU 4 in FIG. 5 are conventional ones, and a description thereof will be omitted.

The control circuit unit 2 is a main part of the data reading apparatus. The control circuit unit 2 recognizes the black/white dots in the mesh pattern of the encoded image EI. Two arrangements of the control circuit unit 2 will be described below.

Example of Control Circuit Unit (1)

Figure 6:
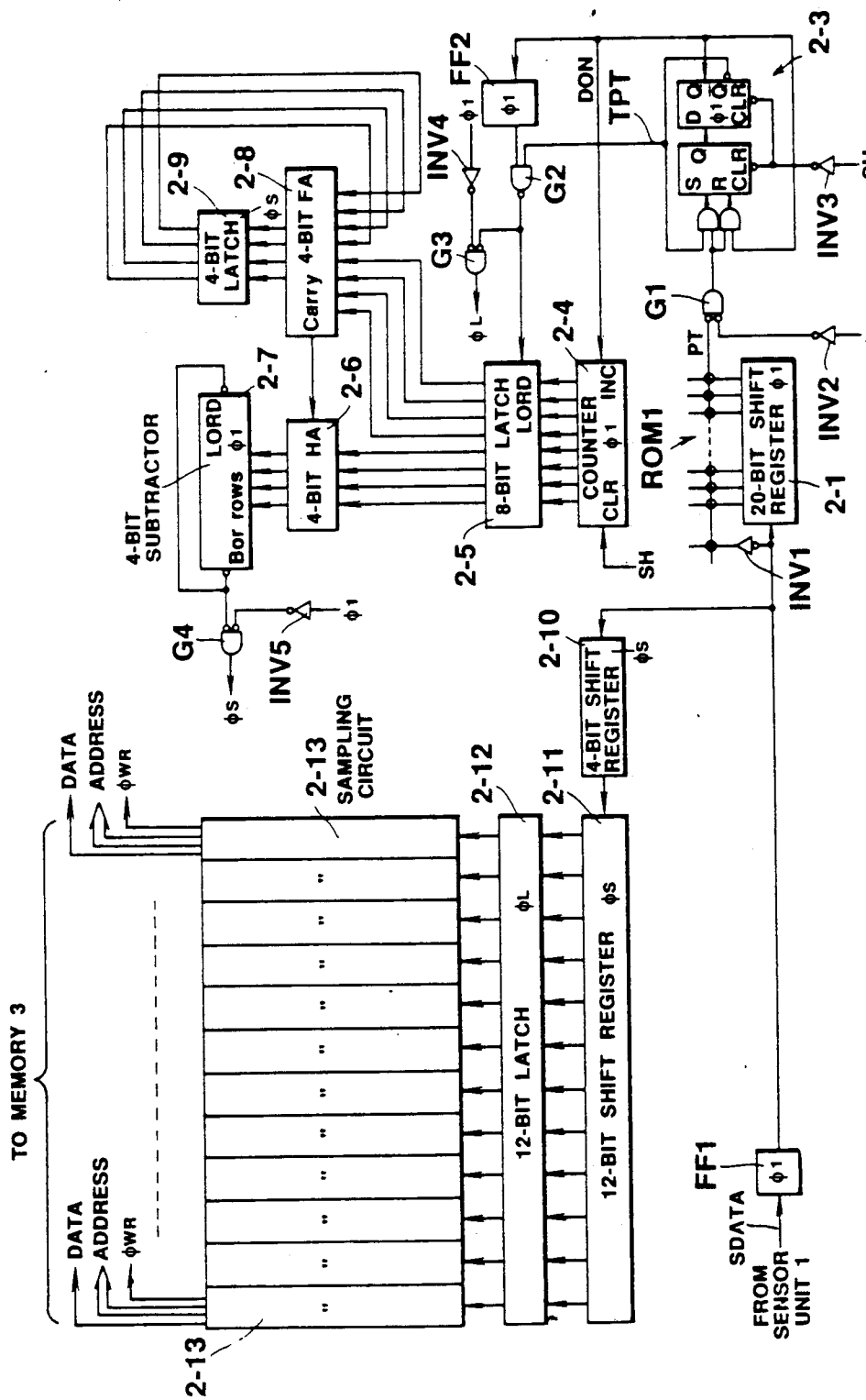
FIG. 6 is a circuit diagram of a control circuit unit shown in FIG. 4.
Figure 7:
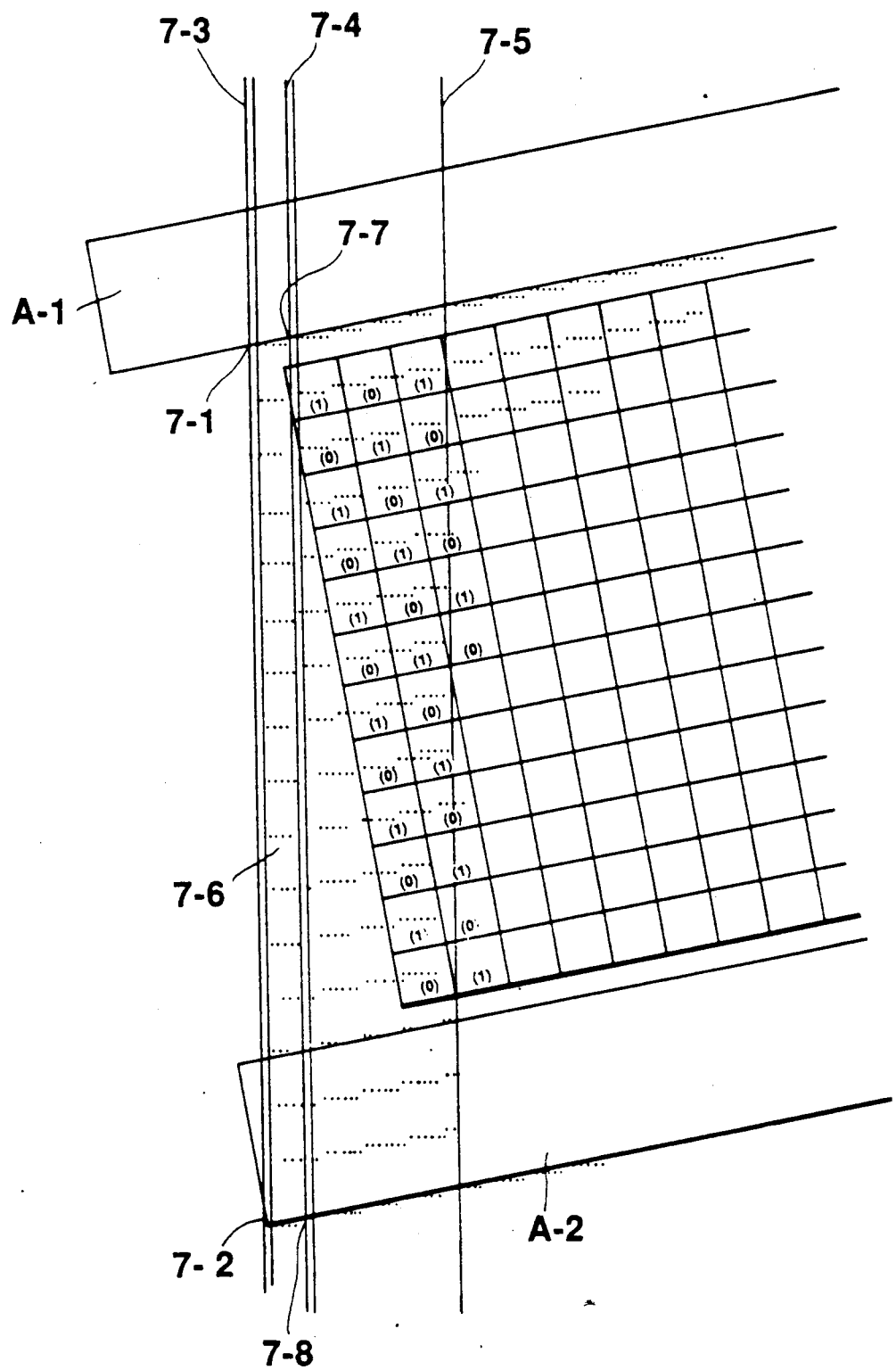
FIG. 7 is an enlarged view of an encoded image for explaining an operation of the control circuit unit.

FIG. 6 shows a first arrangement of the control circuit unit 2. The control circuit unit 2 receives image data from the sensor unit 1 described above. This arrangement is made under the assumption that the sensor unit 1 scans the encoded image EI from the left to the right, as shown in FIG. 5. FIG. 7 is a view for explaining FIG. 6, and shows a case wherein an encoded image EI is obliquely scanned by the sensor unit 1. If actual dimensions of each dot of the mesh pattern are 0.5 mm×0.5 mm, FIG. 7 is an enlarged view of the dots at a magnification of about 16. Therefore, if the sensor unit 1 is assumed to have a resolution of 16 lines per mm, a black/white dot per mm is read in FIG. 7. Lines 7-3 and 7-4 represent input image data for one line of the sensor unit 1.

Figure 10:
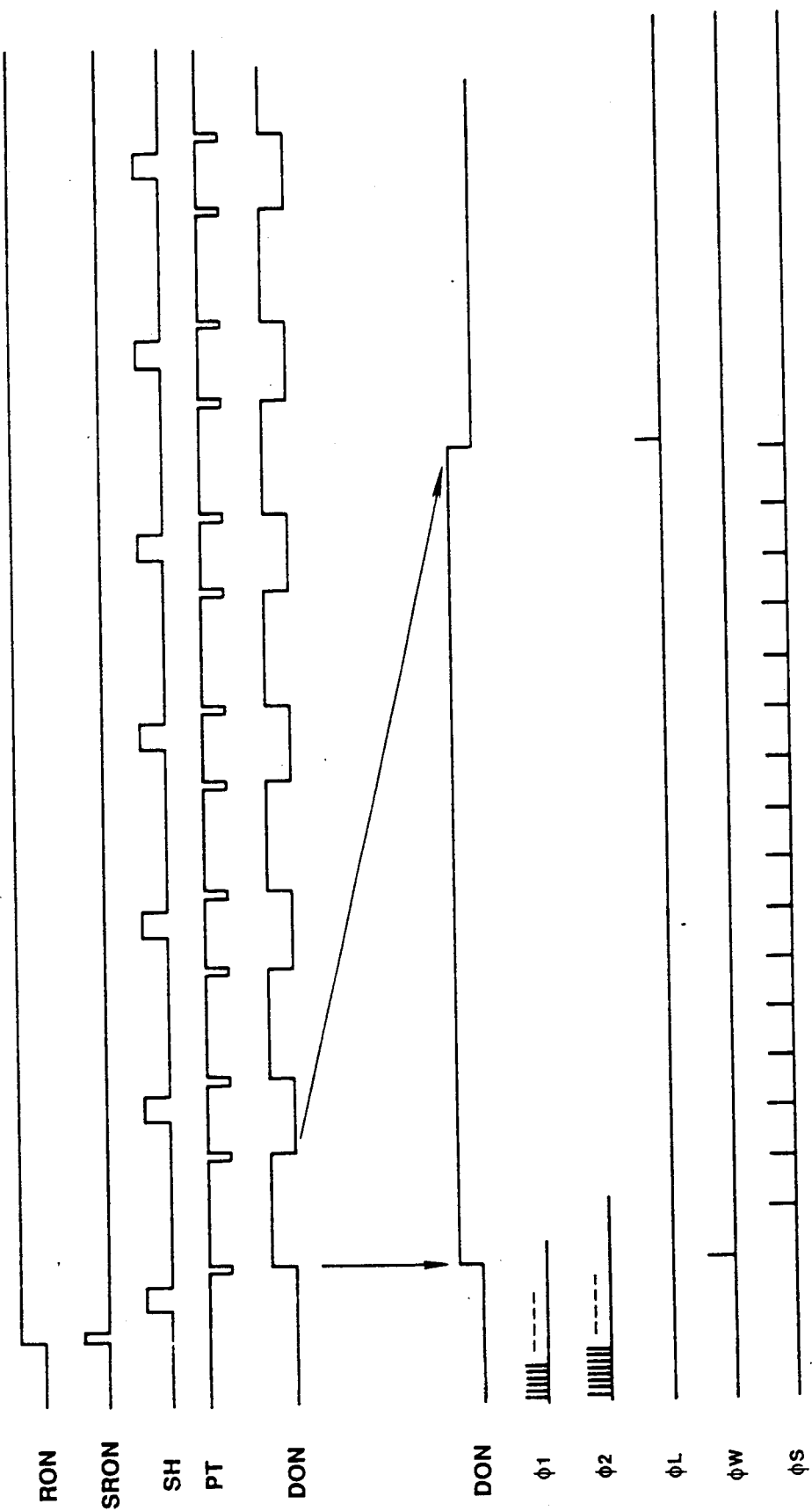
FIG. 10 is a timing chart of principal signals used in the control circuit unit.

In FIG. 6, a signal SDATA is serial image data supplied from the sensor unit 1. In this embodiment, data corresponding to about 160 bits are output per one scan (one scan line) of the sensor. The data SDATA passes a flip-flop FF1 enabled in synchronism with a clock $\phi1$ (FIG. 10), and is then supplied to a 20-bit shift register 2-1. The outputs from the 20-bit shift register 2-1 and the input data SDATA through an inverter INV1 are supplied to a ROM1 constituting a NAND gate. The ROM1 outputs a signal PT (FIG. 10). When the input data SDATA has one white bit following 20 continuous black bits, the signal PT goes to low level, i.e., is set in an active state. These circuit elements detect the edges (points 7-1 and 7-2 in FIG. 7) of the upper and lower bars. Note that in FIG. 6, latches and registers perform a read operation in response to the clock $\phi1$ and perform an output operation in response to a clock $\phi2$ (FIG. 10) unless otherwise specified. The signal PT is supplied to a gate G1 together with a signal obtained by inverting the clock $\phi1$ by an inverter INV2. An output signal from the gate G1 is supplied to a circuit 2-3 including an S-R flip-flop and a D-flip-flop as major components. The circuit 2-3 forms a signal DON (FIG. 10) which goes to high level (active level) from the edge 7-1 to the edge 7-2 of the upper and lower bars. Note that the circuit 2-3 receives, through an inverter INV3, a signal SH (FIG. 10) which is generated every time image data for one scan line is supplied from the sensor unit 1. The circuit 2-3 is reset by an output signal $\overline{SH}$ from the inverter INV3.

The signal DON is supplied to a counter 2-4 which is reset by the signal SH. The counter 2-4 counts the number of clock pulses $\phi1$ while the signal DON is at high level, i.e., from detection of the edge 7-1 of the upper bar A-1 to detection of the edge 7-2 of the lower bar A-2. The signal DON is also supplied to a flip-flop FF2. The output signal of the flip-flop FF2 and another output signal TPT (a $\overline{Q}$ output of the D-flip-flop) of the circuit 2-3 are supplied to a NAND gate G2. The output from the NAND gate G2 becomes a signal which goes to high level when the sensor unit 1 detects the trailing edge 7-2, and is input to an 8-bit latch 2-5 as a load control signal. The count value of the counter 2-4 when the load control signal goes to "high level" represents a distance from the leading edge 7-1 (7-7) to the trailing edge 7-2 (7-8). This count value is latched by the latch 2-5.

The output signal from the gate G2 is supplied to a gate G3 together with an inverted signal of the clock 1 from an inverter INV4. The output signal of the gate G3 becomes a signal $\phi$L (effective line end signal) which goes to high level when the sensor unit 1 detects the trailing edge 7-2 (FIG. 10).

A circuit (2-6, 2-7, 2-8, 2-9, INV5, and G4) at the output side of the latch 2-5 almost equally divides a distance from the leading edge 7-1 to the trailing edge 7-2 into 16 sections. Thus, timing signals $\phi$S (FIG. 10) corresponding to vertical sampling positions of the mesh pattern MP ca be obtained. The sampling positions are represented by 7-6 (...) in FIG. 7. The number of equally divided sections is set to be 16 since the width of the bar A-2 corresponds to three dots, 12 rows of dots are present between the upper and lower bars A-1 and A-2, and an interval between the bar A-1 or A-2 and the mesh pattern corresponds to half a dot in the image data of FIG. 7. If timings are obtained by equally dividing an interval between a detection timing of the edge 7-1 and a detection timing of the edge 7-2 into 16 sections, first 12 out of 16 timings represent vertical sampling timings of 12 rows of dots.

The circuit (2-6, 2-7, 2-8, 2-9, INV5, and G4) will be described in detail below. Upper four bits of the latch 2-5 are supplied to a half adder (HA) 2-6. The output from the half adder 2-6 serves as load data to a subtractor 2-7. The subtractor 2-7 decrements data by one in response to the clock $\phi$1, and loads the data from the half adder 2-6 every time its borrow output is generated. The borrow output of the subtractor 2-7 is supplied to a gate G4 together with an inverted signal of the clock $\phi$1 from an inverter INV5. The output signal of the gate G4 serves as a sampling signal $\phi$S (indicating a sampling timing) in a vertical (main scan) direction. Lower four bits of the output data of the 8-bit latch 2-5 are input to four inputs of a 4-bit full adder (FA) 2-8. The outputs from 4-bit full adder FA are fetched by a latch 2-9 in response to the signal $\phi$S. The outputs from the latch 2-9 are input to the remaining four inputs of the full adder 2-8. The carry output of the full adder 2-8 serves as an LSB input of the 4-bit half adder 2-6. For example, paying attention to a line 7-4 in FIG. 7, if 130-bit image data are present between edges 7-7 and 7-8, a value "130" (decimal notation) is counted by the counter 2-4, and data "10000010" (binary notation) is latched by the latch 2-5. Upper four bits "1000" of this data cause the gate G4 to output the signal $\phi$S once per 8 clocks $\phi$1. On the other hand, lower four bits "0010" of the latched data of the latch 2-5 cause the full adder 2-8 to output the carry output once every 8 clocks $\phi$S. The carry output is input to the half adder 2-6. For this reason, the load data of the subtractor 2-7 which calculates the signal $\phi$S is incremented by 1. In a cycle in which the carry is output, the signal $\phi$S is output with a delay corresponding to one clock $\phi$1.

In response to the vertical sampling signal $\phi$S, a 4-bit shift register 2-10 and a 12-bit shift register 2-11 fetch (sample) image input data from the flip-flop FF1. The outputs of the 12-bit shift register 2-11 are latched by a 12-bit latch 2-12 in response to the timing signal $\phi$L representing detection of the trailing edge 7-8. Data input to the latch 2-12 are those at vertical sampling positions of the dots of the image data SDATA for the present line.

The outputs from the latch 2-12 are supplied to 12-channel sampling circuits 2-13. The sampling circuits 2-13 select image data (data indicating black/white (0/1) levels of dots) at the horizontal sampling positions, and write them into the memory 3. The sampling circuits 2-13 will be described in detail later.

Figure 8A:
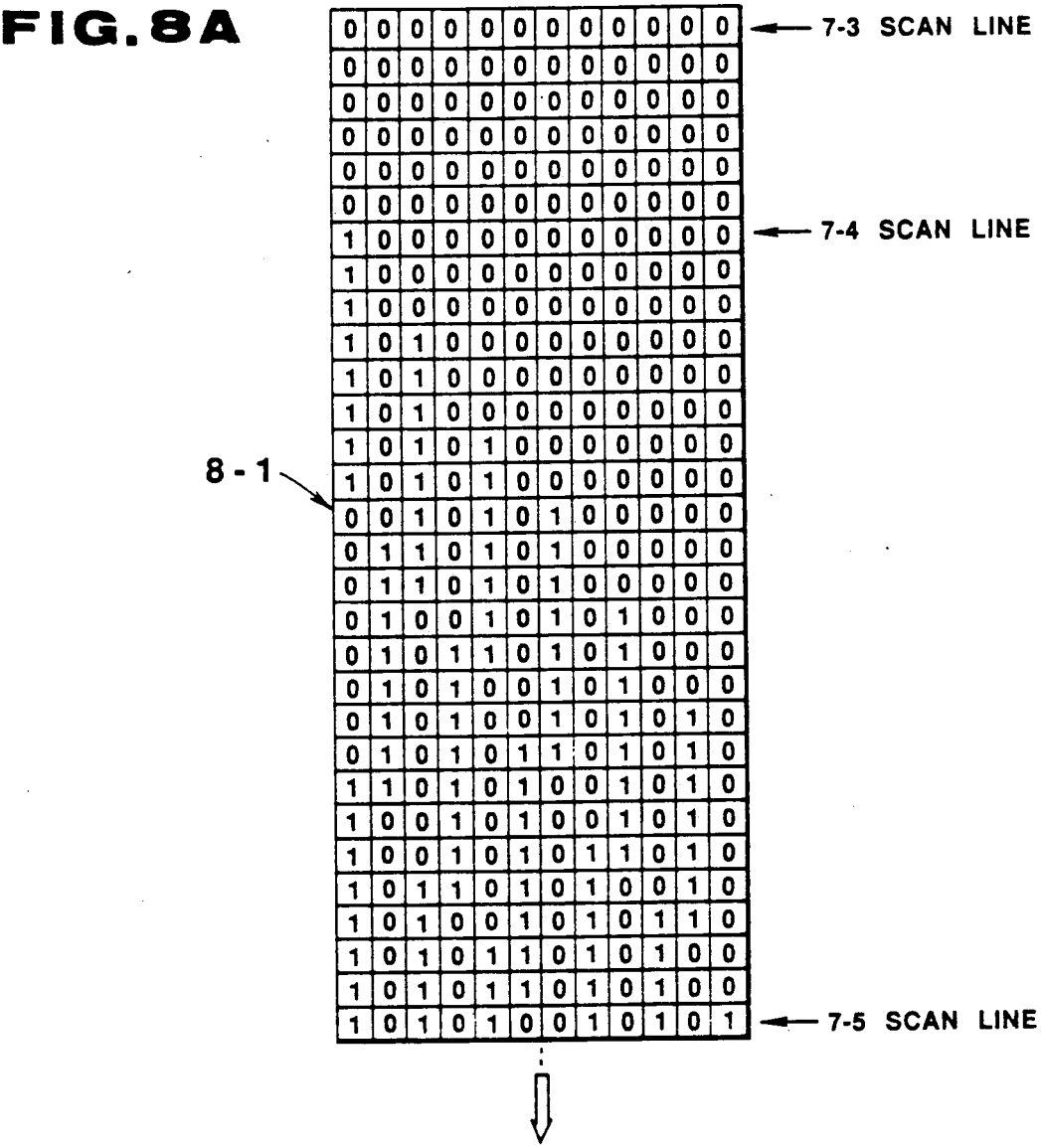

FIG. 8A shows sampled data. More specifically, data shown in FIG. 8A represent the contents of the latch 2-12 in units of scan lines. For example, the first row of FIG. 8A represents data of sampling positions when a line 7-3 in FIG. 7 is scanned. Similarly, the seventh row of FIG. 8A represents sampling data when a line 7-4 is scanned, and the lowermost row of FIG. 8A represents sampling data when a line 7-5 is scanned. FIG. 8B shows data actually written in the memory 3, and conversion from the data shown in FIG. 8A to data shown in FIG. 8B is performed by the sampling circuits 2-13.

Figure 9:
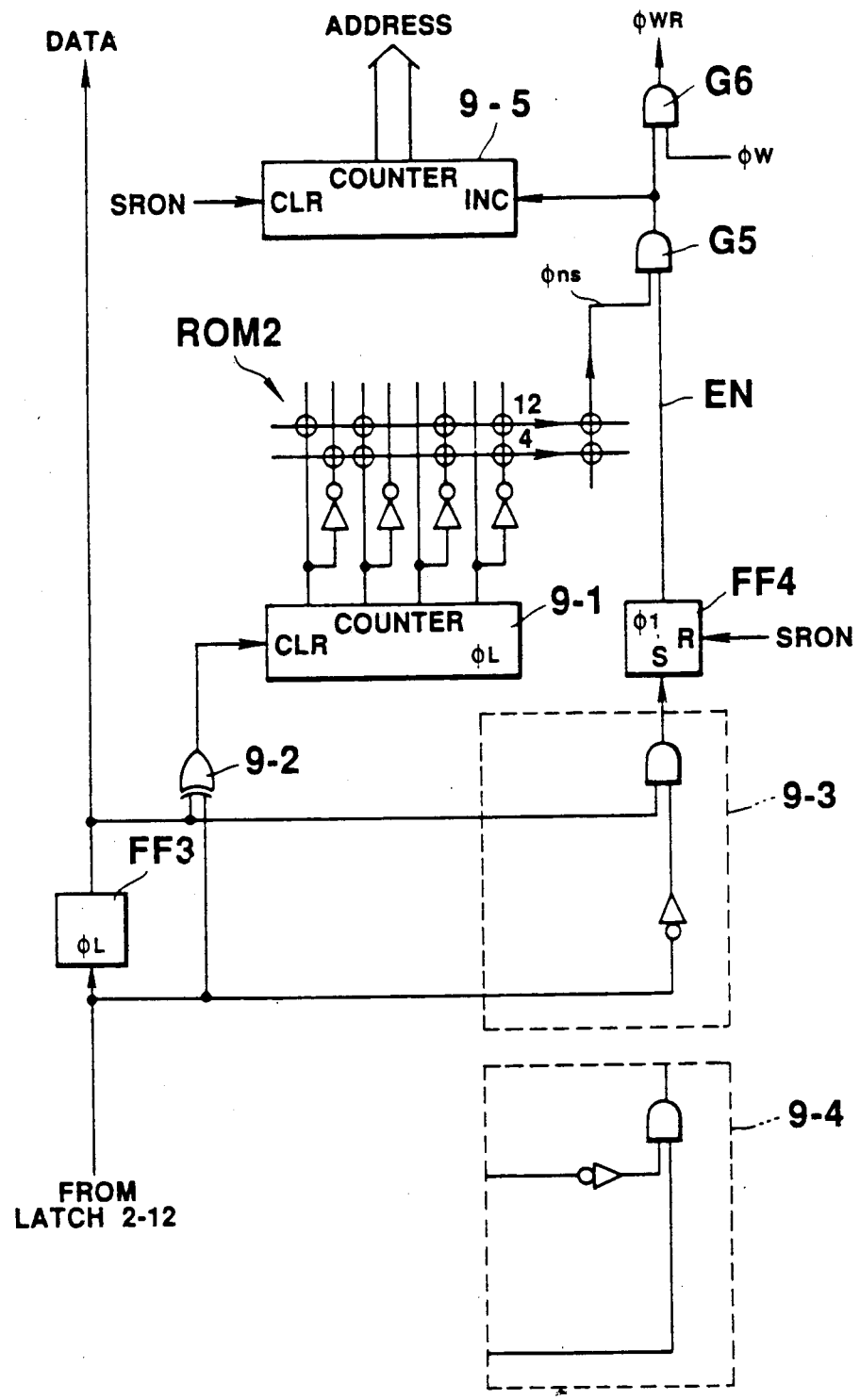
FIG. 9 is a circuit diagram of a sampling circuit shown in FIG. 6.

The arrangement of the sampling circuit will be described below with reference to FIG. 9. In FIG. 9, a counter 9-1 counts the number of successive bits "0" or "1" (the number of lines $\phi$L) for columns of data shown in FIG. 8A. The counter 9-1 is reset by an EX-OR 9-2 when data in the column is changed from "0" to "1" or from "1" to "0". More specifically, when the EX-OR 9-2 detects a noncoincidence between the vertical sampling data of the present line from the 1-bit latch 2-12 (FIG. 6) and vertical sampling data of a immediately preceding line from a flip-flop FF3, it resets the counter 9-1. The output from the counter 9-1 is supplied to a ROM2. The ROM2 generates a horizontal sampling signal $\phi$ns when the output from the counter 9-1 is 4 or 12 (after the lapse of a time corresponding to 4 or 12 lines from when the output from the latch 2-12 changes to "0" or "1"). A change in output from the latch 2-12 from "0" to "1" or from "1" to "0" corresponds to detection of a switching point (boundary) from a white dot to a black dot or vice versa.

In FIG. 9, a circuit 9-3 is provided to each of odd-numbered channel (odd-numbered circuits from the left in FIG. 6) sampling circuits 2-13. In each of even-numbered channels, a circuit 9-4 is used in place of the circuit 9-3. The circuits 9-3 and 9-4 are used to detect start of data. As shown in FIG. 2, in the "left end" mesh pattern, dots in each odd-numbered row (e.g., the uppermost row) are changed from black ("1") to white ("0"), while dots in each even-numbered row are changed from white ("0") to black ("1") along the scanning direction (FIG. 5). The circuit 9-3 in each odd-numbered channel detects a change from a white dot to a black dot in the "left end" pattern. The outputs from the circuits 9-3 and 9-4 set a flip-flop FF4 to cause it to output a signal EN indicating that data is being scanned. The flip-flop FF4 is reset in response to a signal generated when the data reading apparatus starts scanning of an image.

The signal $\phi$ns and the signal EN are supplied to an AND gate G5. An AND gate G6 receives the output signal from the AND gate G6 and a clock W (clock generated in response to the trailing edge of a signal DON). The AND gate G6 generates a write signal $\phi$WR to the memory 3 after data reading is started. In response to the signal φWR, the content (DATA) of the flip-flop FF3 is written in the memory 3. Furthermore, the output signal φns of the gate G5 increments an address counter 9-5 to designate the next address (ADDRESS) of the memory 3.

FIG. 10 shows timing charts of principal signals. RON in FIG. 10 is a signal representing that the data reading apparatus scans an image, and SRON in FIG. 10 is a one-shot pulse generated at the beginning of scanning. φW in FIG. 10 is a clock generated at the leading edge of the signal DON (upon passing the edge 7-1 of the upper bar A-1). Other signals have already been described with reference to FIGS. 6 and 7, and a description thereof will be omitted.

The control circuit unit 2 (FIGS. 6 and 9) of the first arrangement performs processing in the following procedures. The control circuit unit 2 (1) receives the image data SDATA from the sensor unit 1 which reads an encoded image shown in FIG. 2 line by line while being moved from the left to the right, (2) detects the edges 7-1 and 7-2 of the upper and lower bars A-1 and A-2 included in the 1-line image data, (3) calculates an interval therebetween, and (4) almost equally divides the interval to detect vertical sampling positions of the mesh pattern MP (by 2-1, ROM1, 2-3 to 2-9, and the like). The control circuit unit 2 (5) extracts vertical sampling data from image data for the next line (by 2-10, 2-11, and 2-12). The control circuit unit 2 (6) then detects boundaries between black and white dots from time-serial image data associated with the vertical sampling positions (by FF3 and 9-2), (7) measures a predetermined time from the detection (by 9-1 and ROM2), (8) extracts corresponding vertical sampling data using a timing corresponding to the lapse of the predetermined time as a timing of the horizontal sampling position, and (9) writes the extracted data in the memory 3 (by G5, G6, 9-5, FF3, and the like).

Therefore, the control circuit unit 2 of the first arrangement can recognize black and white dots in the mesh pattern MP at high speed. As shown in FIG. 7, when the sensor unit 1 obliquely scan the encoded image EI, the vertical sampling positions can be assured, and no problem occurs in data recognition.

However, in the above arrangement, the horizontal sampling timing corresponds to the lapse of the predetermined time from detection of a boundary between horizontally adjacent black and white dots. For this reason, when the sensor unit 1 is manually moved, the horizontal scanning speed of the mesh pattern varies, and the horizontal data sampling position is shifted. As a result, erroneous data recognition may be made.

A control circuit unit (second arrangement) which can cope with this problem will be described below.

Example of Control Circuit Unit (2)

The control circuit unit of the second arrangement includes a circuit for detecting a horizontal scanning speed of the sensor unit 1 from a specific pattern included in the mesh pattern MP.

Figure 11:
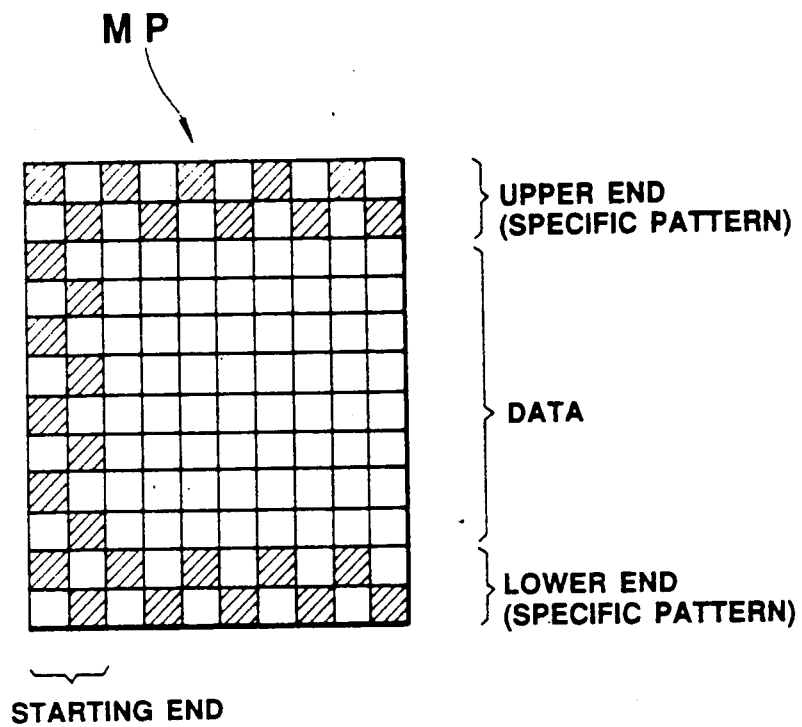
FIG. 11 is an enlarged view of a specific pattern in a mesh pattern of an image for explaining another arrangement of the control circuit unit shown in FIG. 4.

The specific patterns are patterns shown at the "upper end" and "lower end" of the mesh pattern MP shown in FIG. 11. More specifically, a mesh pattern in which black and white dots alternately appear along the horizontal direction is utilized. In FIG. 11, although neither black nor white dots are illustrated in the data area, dots are changed from white to black at least every two dots in the horizontal direction. In order to change dots from white to black at least every two dots, two data dots represent 1 bit. Bit "1" is expressed by ■□ or □■ bit "0" is expressed by ■ or □ and the encoded image EI is recorded so that a boundary between black and white dots is formed between a 1-bit dot pair and an adjacent dot on the left or right side thereof. For example, when bit "1" is recorded on the right side of ■□

(bit "1"), a pattern ■□ is selected; when bit "0" is recorded, a pattern ■ is selected.

Other operating conditions (scanning direction, and the like) are the same as those in the first arrangement.

Figure 12:
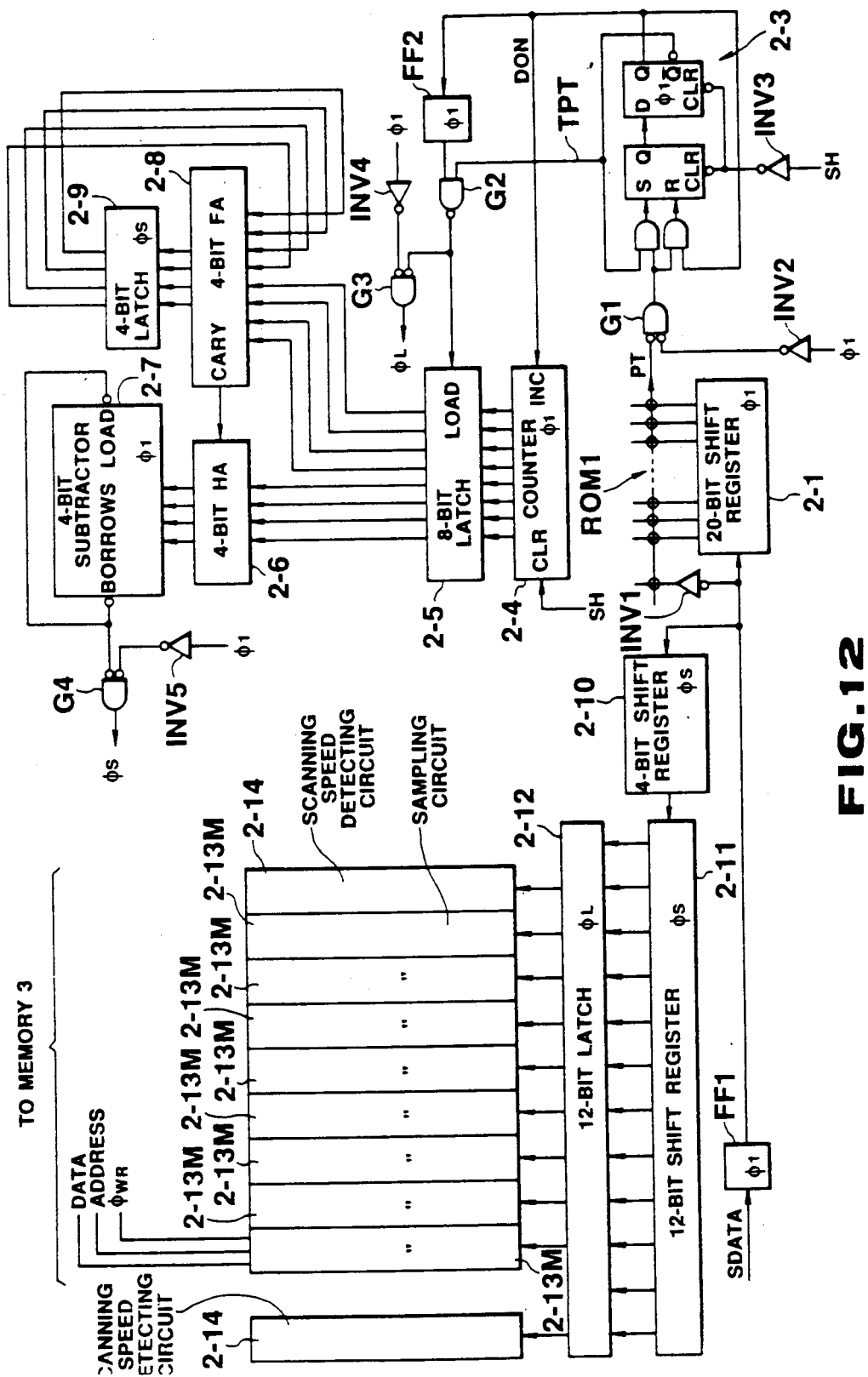
FIG. 12 is a circuit diagram showing another arrangement of the control circuit unit shown in FIG. 4.

FIG. 12 shows a control circuit unit 2M of the second arrangement. The arrangement for detecting vertical sampling positions and the arrangement for sampling image data at the vertical sampling positions are the same as those in the control circuit unit 2 of the first arrangement. A difference between FIGS. 6 and 12 is that 2-channel scanning speed detecting circuits 2-14 are arranged, and sampling circuits 2-13M are modified. The 2-channel scanning speed detecting circuits 2-14 have the same arrangement. The circuits 2-14 receive inputs from the 1st and 11th bits each of the 12-bit latch 2-12 to detect the horizontal scanning speed of the sensor unit 1 on the basis of patterns in the 1st and 11th rows in the mesh pattern MP shown in FIG. 11.

Figure 13:
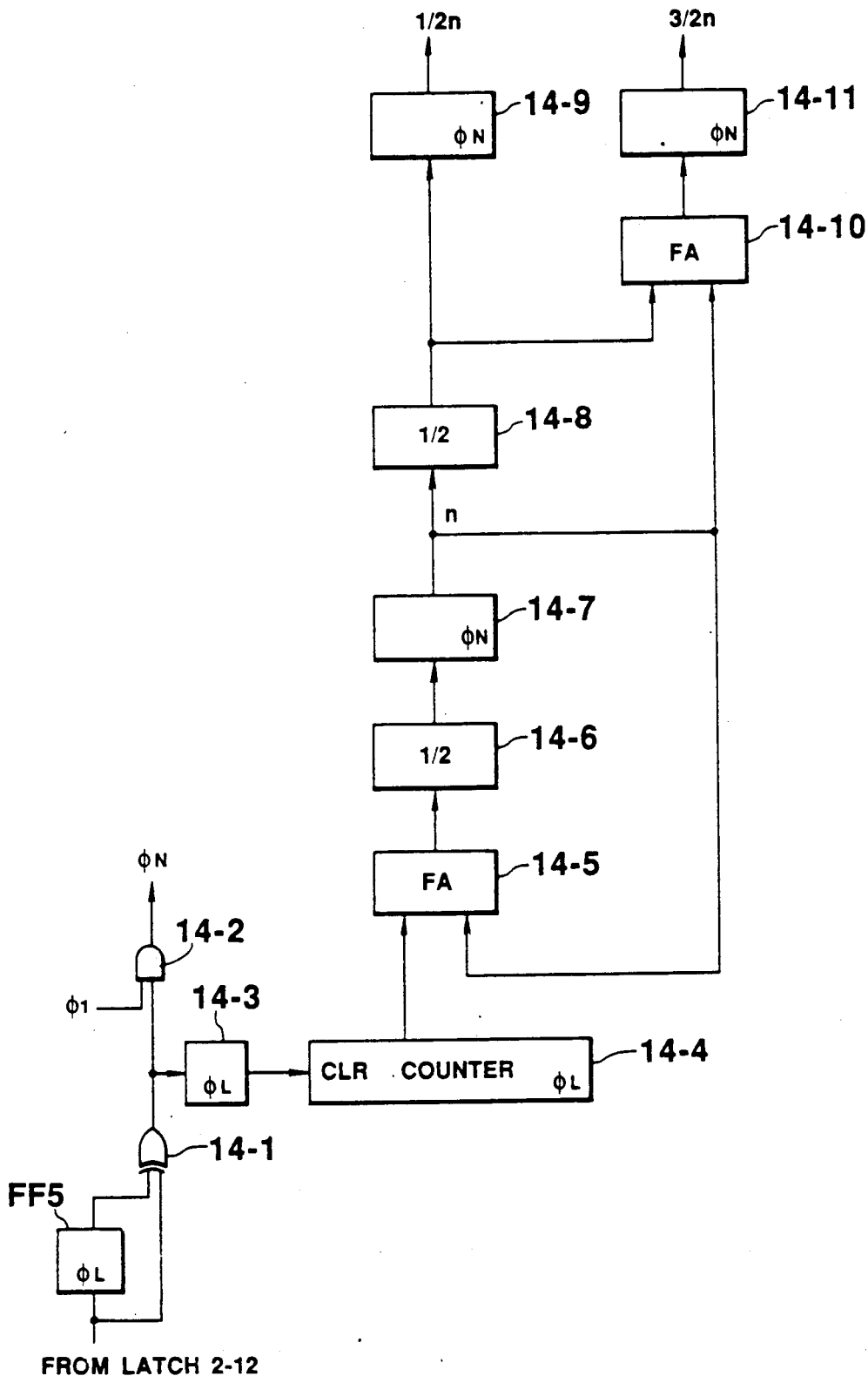
FIG. 13 is a circuit diagram of a scanning speed detecting circuit shown in FIG. 12.

FIG. 13 shows the arrangement of each scanning speed detecting circuit 2-14.

The 1st or 11th bit data of the latch 2-12 is supplied to a flip-flop FF5 and an EX-OR gate 14-1. The output data from the flip-flop FF5 is supplied to the EX-OR gate 14-1. The EX-OR gate 14-1 detects a boundary between black and white dots in the pattern of the 1st or 11th row as the specific pattern shown in FIG. 11. The output signal from the EX-OR 14-1 resets a counter 14-4 through a flip-flop 14-3. The output signal from the EX-OR gate 14-1 is supplied to a gate 14-2 together with the clock 1. The gate 14-2 generates a signal φN (latch clock) in synchronism with the clock φ1. The counter 14-4 counts the number of successive white (bit "0") or black (bit "1") dots from the boundary, i.e., scan lines in response to the line signals φL. A boundary between black and white dots in the specific pattern (1st row or 11th row in FIG. 11) appears every other dots. Therefore, the count value of the counter 14-4 represents a time from detection of a given boundary to detection of the next boundary. This means that the horizontal scanning speed of the sensor unit 1 is detected. The count value of the counter 14-4 is input to full adder (FA) 14-5, and is added to an immediately preceding sum. The sum of the full adder 14-5 is supplied to a ½ divider 14-6, and is divided by 2. The output data of the ½ divider 14-6 is latched by a latch 14-7 at a timing φN representing detection of the boundary of the specific pattern. An output n of the latch 14-7 is sent to the full adder (FA) 14-5 as an immediately preceding sum, and is supplied to a latch 14-9 which is operated in response to the clock φN through a ½ divider 14-8. The latch 14-9 generates an n/2 signal The output from the latch 14-7 and the output from the ½ divider 14-8 are added to each other by a full adder (FA) 14-10. The output data from the full adder 14-10 is supplied to a latch 14-11 which is operated in response to the clock φN. The latch 14-11 generates a 3n/2 signal. The n/2 signal represents a time required for the sensor unit 1 to move by half a dot at its present horizontal scanning speed, and the 3n/2 signal represents a time required for the sensor unit 1 to move by a dot $+\frac{1}{2}$ at its present horizontal scanning speed.

Figure 14:
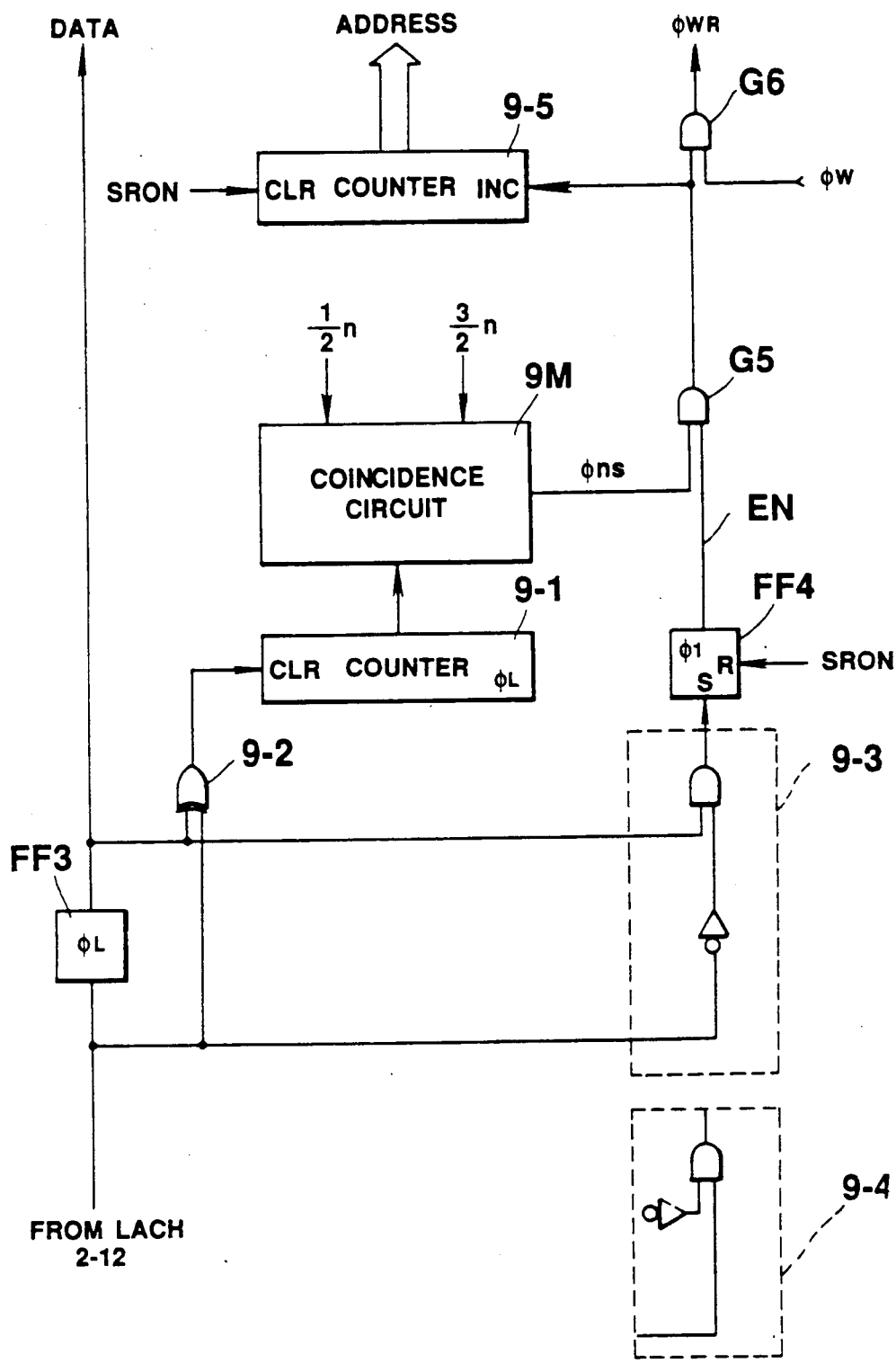
FIG. 14 is a circuit diagram of a sampling circuit shown in FIG. 12.

These two signals n/2 and 3n/2 are utilized in each sampling circuit 2-13M to generate the horizontal sampling position signal. FIG. 14 shows the arrangement of the sampling circuit 2-13M. A difference between the sampling circuit 2-13M in FIG. 14 and the sampling circuit 2-13 (FIG. 9) in the first arrangement is that a coincidence circuit 9M is used in place of the ROM2 (circuit for detecting a coincidence between the output from the counter 9-1 and a fixed value). The coincidence circuit 9M compares the n/2 and 3n/2 signals which change in accordance with the scanning speed with the output from the counter 9-1 to detect a coincidence/ noncoincidence. More specifically, the coincidence circuit 9M detects a timing corresponding to the lapse of an n/2 time or 3n/2 time from detection of the boundary between black and white dots in a data row of the mesh pattern MP, and generates a horizontal sampling position signal ϕns. As described above, the n/2 time corresponds to movement by half a dot, and the 3n/2 time corresponds to movement by one dot $+\frac{1}{2}$. Meanwhile, the data row (each of the 3rd to 10th rows in FIG. 11) changes from white to black or vice versa in a cycle of at least two dots. Therefore, the coincidence signal ϕns of the coincidence circuit 9M designates a substantially central position of each dot of the data row regardless of a variation in scanning speed. Note that although two scanning speed detecting circuits 2-14 are arranged, the outputs (n/2, 3n/2) of the scanning speed detecting circuit 2-14 corresponding to the specific pattern at the upper end (FIG. 11) are input to the sampling circuits 2-13M corresponding to upper half data rows, and the outputs of the scanning speed detecting circuit 2-14 corresponding to the specific pattern at the lower end are input to the sampling circuits 2-13M corresponding to lower half data rows. Alternatively, the outputs from the scanning speed detecting circuit 2-14 which scans the specific pattern first are input to all the sampling circuits 2-13M, and the outputs from the scanning speed detecting circuit 2-14 which scans the specific pattern later may be inhibited from being used. Other operations of the sampling circuits 2-13M in FIG. 14 are the same as those in the sampling circuits 2-13 in FIG. 9, and a description thereof will be omitted.

In this manner, the control circuit unit 2M of the second arrangement detects the horizontal scanning speed of the sensor unit 1 on the basis of the specific patterns included in the mesh pattern MP, and then detects horizontal data sampling positions on the basis of boundaries between black and white dots detected in association with the data rows of the mesh pattern MP. For this reason, the horizontal sampling positions can be set at correct positions regardless of a variation in scanning speed of the sensor unit 1, and data of an encoded image from an image sensor which scans at a variable moving speed can be reliably recognized.

(Modification)

The first embodiment of the present invention has been described. The above embodiment is merely an example, and various changes and modifications may be made.

The scanning speed dependent signals n/2 and 3n/2 input to the coincidence circuit 9M shown in FIG. 14 may be generated on the basis of an output (scanning speed signal) of a rotary encoder provided to the sensor unit 1.

The control circuit unit 2M of the second arrangement has been described under the assumption that each data row of the mesh pattern MP is changed from white to black or vice versa in a cycle of at least two dots. However, the control circuit unit 2M can be slightly modified to cancel this assumption. For example, a circuit for resetting the counter 9-1 when the output from the counter 9-1 coincides with the signal n (FIG. 13) representing movement by one dot may be added to the arrangement shown in FIG. 14. In this case, the coincidence circuit 9M detects a coincidence between the output from the counter 9-1 and the n/2 signal.

In FIG. 11, the specific pattern constituted by two rows is formed at each of the upper and lower ends. Alternatively, a specific pattern (in which black and white dots alternately appear) of one row can be formed as the central row of the mesh pattern to extend in the horizontal direction to be longer than other rows. In this case, the scanning speed detecting circuit 2-14 need only be arranged for one channel.

The mesh pattern has a rectangular shape as a whole, but may have a square or parallelogram shape.

Image data input to the control circuit unit 2 may be transferred from an image memory storing the encoded image EI.

Various other changes and modifications may be made within the spirit and scope of the invention.

As described above, according to the first embodiment, a recording sheet of an image including a mesh pattern obtained by encoding data by selectively formed black and white dots is used as a recording medium. And the data reading apparatus is constituted by hardware means (vertical data sampling position calculating circuit means, horizontal data sampling position calculating circuit means, and data sampling circuit means) for detecting vertical and horizontal data sampling positions of the mesh pattern to sample image data at these positions in order to recognize black and white dots from the image read by the image sensor means. Therefore, data recognition of a high-density encoded image can be performed at high speed.

As a mark for indicating vertical sampling positions of the mesh pattern, a pair of bars are formed along the upper and lower sides of the mesh pattern. The data reading apparatus measures an interval between the pair of bars, and equally divides the measured interval to detect vertical sampling positions. Therefore, even if the image sensor means obliquely reads the encoded image on the recording sheet, vertical data sampling positions can be maintained at correct positions. In this data reading apparatus, a line image sensor for reading an image line by line while being moved from one side portion of the mesh pattern to the other side portion is used as the image sensor means. The horizontal data sampling position calculating circuit means detects a boundary between horizontally adjacent black and white dots included in the mesh pattern, and detects a timing corresponding to the lapse of a predetermined time from this detection as a horizontal data sampling timing Therefore, the apparatus is a simple arrangement, and as long as the moving (scanning) speed of the image sensor means is constant, a correct horizontal sampling position can be obtained. However, it is not suitable for image sensor means whose moving speed is variable.

When the data reading apparatus is constituted using scanning speed detecting circuit means for detecting a horizontal scanning speed of the image sensor means, a correct horizontal data sampling position can be detected for an image from the image sensor means who scanning speed varies, and reliable data recognition can be performed.

A row in which black and white dots alternately appear in the horizontal direction is formed as a specific pattern in the mesh pattern, a boundary between black and white dots in this specific pattern is detected, and a time between two adjacent boundaries is detected to detect a scanning speed of the image sensor means. In this case, as compared to a case using an apparatus for detecting a scanning speed of image sensor means independently of an image (e.g., a rotary encoder), an arrangement can be rendered and simple, and its precision can be improved.

(Second Embodiment)

This embodiment is an improvement of the first embodiment and is characterized in that an operation error upon reading of binary data is prevented.

More specifically, in this embodiment, a mesh pattern in which each 1-bit encoded image is constituted by a black-and-white pattern of a predetermined number of dots, and boundaries between two adjacent black and white dots are regularly distributed is recorded on a data recording medium. The data reading apparatus utilizes these features to improve its data recognition rate.

Figure 15A:
FIGS. 15A to 15E show 1-bit encoded images according to a second embodiment of the present invention.
Figure 15B:
Figure 15C:
Figure 15D:
Figure 15E:

An encoded image of this embodiment will be described below. FIGS. 15A to 15E show encoded images each representing 1 bit. According to this embodiment, each 1-bit encoded image is expressed by a black-and-white pattern of a plurality of dots. In this embodiment, as shown in FIG. 15A, four dots correspond to 1 bit. Patterns shown in FIGS. 15B and 15C represent bit "0", and patterns shown in FIGS. 15D and 15E represent bit "1". Assume that a white dot is given by "0", a black dot is given by "1", and a bit pattern is represented by a numerical value in the order of upper left, upper right, lower left, and lower right. The patterns representing bit "0" shown in FIGS. 15B and 15C are respectively "1100" and "0011", and the patterns representing bit "1" shown in FIGS. 15D and 15E are respectively "0110" and "1001". In either 1-bit encoded image, a horizontal central line of four dots serves as a boundary between black and white dots.

When these 1-bit encoded images are arranged in a matrix to form a mesh pattern, these images are coupled so that the right and left sides of each 1-bit image serve as boundaries between black and white dots. For example, if a 1-bit encoded image of "0" is coupled to the right side of the pattern shown in FIG. 15B, the pattern shown in FIG. 15C is selected; when a 1-bit encoded image of "1" is coupled, the pattern shown in FIG. 15D is selected.

Figure 16:
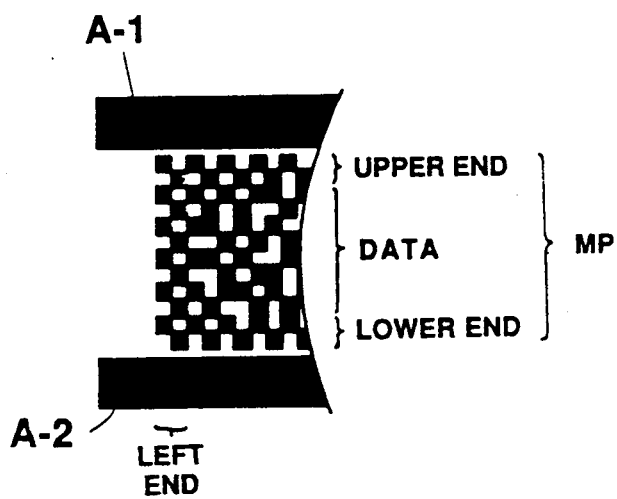
FIG. 16 shows an encoded image recorded on a recording sheet.

FIG. 16 shows an example of an image recorded on the data recording medium according to this coupling method. In FIG. 16, reference symbol MP denotes a mesh pattern in which 1-bit encoded images are arrayed according to the above-mentioned coupling method. In this case, two rows at the "upper end", two rows at the "lower end", and two columns at the "left end" include the pattern shown in FIG. 15E, and represent ends of the mesh pattern MP. A portion other than these ends is a data area. In FIG. 16, the data area is constituted by 8 rows of patterns.

The horizontal central line and right and left sides of each 1-bit encoded image are used as boundaries between black and white dots, so that the boundaries are almost uniformly distributed in the mesh pattern MP. When the boundaries between the black and white dots are uniformly distributed, a maximum number of dots which have the same lightness and are successively coupled is limited to two, and this stabilizes the operation of an image sensor (to be described later) and facilitates binarization of black and white dots.

In FIG. 16, the specific patterns located at the "upper end" and "lower end" are utilized to detect a horizontal moving speed (scanning speed) of an image sensor when image data is read while moving the image sensor from the left end toward the right end of an encoded image.

In FIG. 16, upper and lower bars A-1 and A-2 are arranged along the upper and lower sides of the mesh pattern MP. These bars A-1 and A-2 are utilized to detect vertical data sampling positions, i.e., an almost central vertical coordinate of each dot in the mesh pattern MP.

In this manner, the encoded image of the second embodiment is the same as that (especially in FIG. 11) of the first embodiment, and only the rule of the mesh pattern is different from that of the first embodiment, as shown in FIG. 15.

Therefore, as a data reading apparatus for reading this image and reproducing binary data, one described in the first embodiment can be used without modifications.

Therefore, a repetitive description thereof will be avoided herein. For example, if the arrangements shown in FIGS. 4, 12, 13, and 14 are employed (of course, the arrangements shown in FIGS. 6 and 9 may be employed), sampling data is finally written in the memory 3 (FIG. 4).

Data indicating a black/white level of each dot of the mesh pattern stored in the memory 3 is converted to a bit for each 1-bit encoded image. This processing will be described below with reference to FIGS. 17A and 17B.

Four squares b, c, f, and g represented by solid lines represent black/white levels of dots of a 1-bit encoded image to be decoded. Squares a, e, d, and h represented by dotted lines represent black/white levels of dots adjacent to the 1-bit encoded image. As described above, in the encoded image shown in FIG. 16, a boundary between black and white dots is present at a horizontal central line of each 1-bit pattern constituted by four dots, and the right and left sides of the 1-bit patterns serve as boundaries between black and white dots. This rule is used in the flow chart shown in FIG. 17B. In addition, assume that black/white levels of adjacent dots are correctly recognized.

In step 10-1, a CPU 4 compares black/white data b of the upper left dot b of a 1-bit pattern to be decoded with black/white data f of the lower left dot f. According to the boundary rule, the black/white data b and f must not coincide with each other. When the black/white data b and f coincide with each other, this means that a sensor unit 1 and a control circuit unit 2 erroneously recognized dots. The flow then advances to step 10-2 to compare the black/white data b with black/white data a of the left neighboring dot a. If the black/white data a is correct, the black/white data a and b do not coincide with each other according to the boundary condition. Therefore, if a=b is established, it can be considered that the black/white data b is erroneously recognized. Thus, the data b is inverted (step 10-3). If the black/white data a and b do not coincide with each other, the flow advances to step 10-4, and black/white data f of the lower left dot of the 1-bit pattern is compared with black/white data e of the left neighboring dot. In this case, if e=f is established, it can be considered that the black/white data f of the lower left dot f is erroneously recognized, and the data f is corrected (step 10-5). If a≠b and e≠f are established when b=f, it means that black/white data of two or more dots of these dots a, b, e, and f are erroneously recognized, and error processing is executed. If the black/white data b and f do not coincide with each other, the flow advances to step 10-6, and black/white data c of the upper right dot c of the 1-bit pattern is compared with black/white data g of the lower right dot g. According to the boundary condition, these data must not coincide with each other. Therefore, if the black/white data c and g coincide with each other, the flow advances to step 10-7, and the black/white data c of the upper right dot c of the 1-bit pattern is compared with black/white data d which is identified for the right neighboring dot d. According to the boundary condition, these data must not coincide with each other. In consideration of the result in step 10-6, both c=g and c=d are established only when only c of the black/white data of the three dots is erroneously recognized (a possibility that the data c is correctly recognized and both the data d and g are erroneously recognized is small). Therefore, the black/white data g is inverted in step 10-8 to have a correct value. If c=d is not established, the black/white data g of the lower right dot g of the 1-bit pattern is compared with black/white data h of the right neighboring dot h. If g=b is established, it is determined that the black/white data is erroneously recognized, and the black/white data g is corrected (step 10-10). If neither of c=d and g=h are established when c=g, these four black/white data include two or more errors, and error processing is performed.

After the processing in steps 10-3, 10-5, 10-8, and 10-10, the flow returns to step 10-1. With these processing operations, the 1-bit pattern (b, c, f, g) is corrected to a correct pattern, and neither of b=f and c=g are established respectively in steps 10-1 and 10-6. In this case, the flow advances to step 10-11, and the black/white data b of the upper left dot in the corrected 1-bit pattern is compared with the black/white data c of the upper right dot c. As can be seen from FIGS. 15B to 15E, b=c is established for the "0" pattern, and is not established for the "1" pattern. Therefore, bit "0" and bit "1" are generated respectively in steps 10-12 and 10-19.

Figure 17:
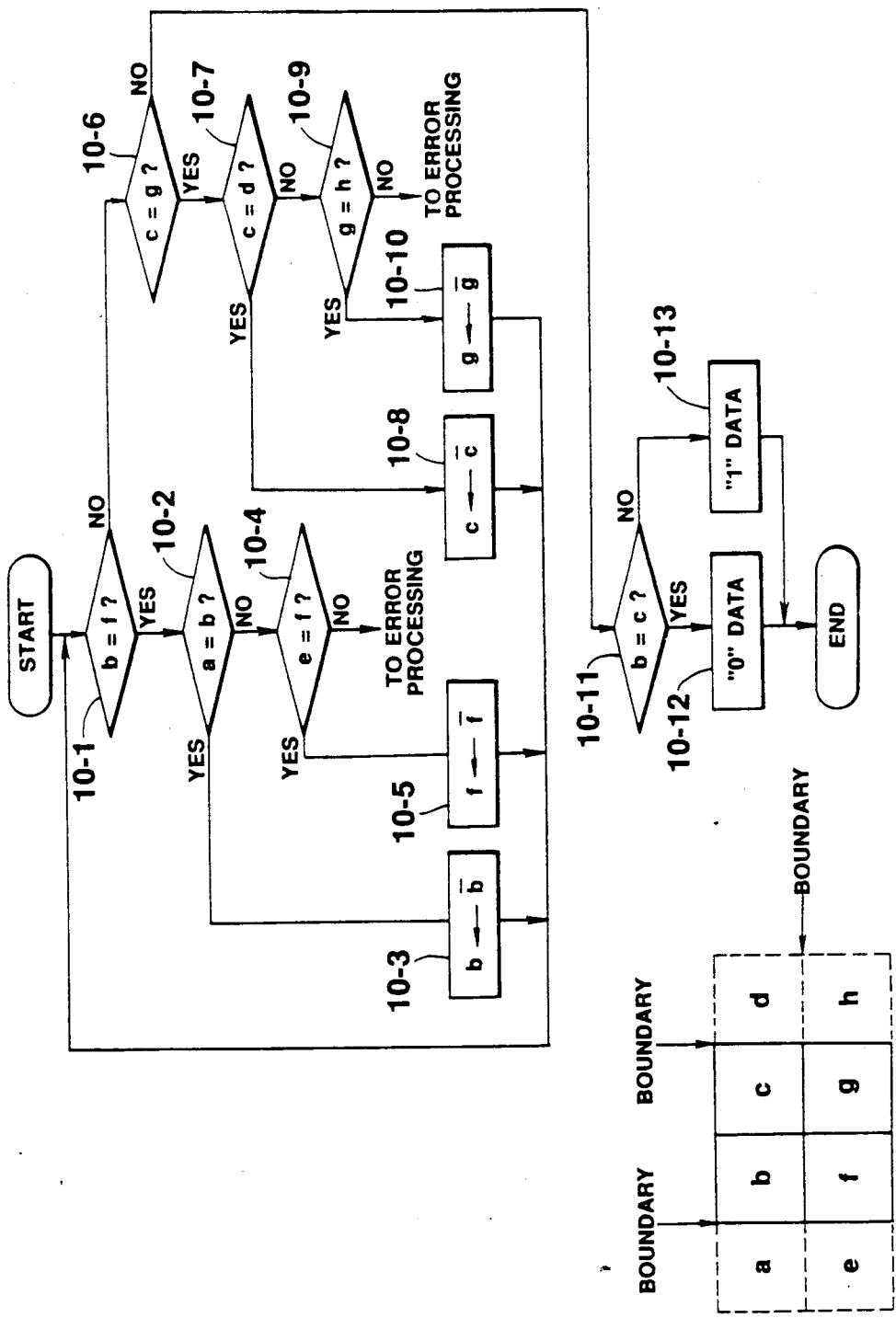
FIG. 17A is a view for explaining data decoding.
FIG. 17B is a flow chart of data decoding executed by a CPU.

Similarly, the flow shown in FIG. 17B is sequentially executed for the next 1-bit encoded image, thus reproducing binary data encoded into the mesh pattern MP.

In the processing in FIG. 17B, black/white data for a total of eight dots are checked for a 1-bit encoded image, as shown in FIG. 17A, and bits which are likely to be correct are decoded based on the check result. Although similar to the processing in FIG. 17B, the black/white data a, b, c, d, e, f, g, and h may be directly compared with reference patterns "01101001" and "10010011 0" of bit "0" and reference patterns "10100101" and "01011010" of bit "1", and the number of noncoincidences may be counted. If the number of noncoincidences is 1 or less, the pattern to be checked is estimated as the corresponding reference pattern, thus decoding a bit.

(Modification)

The present invention is not limited to the above embodiment, and various changes and modifications may be made.

For example, in this embodiment, a black/white level of each dot is identified by the control circuit unit 2 as the hardware means. However, the identification operation may be executed by the CPU 4 if a decrease in recognition speed does not pose a problem. In association with this, specific patterns at the ends of the encoded image EI and the upper and lower bars A-1 and A-2 are not always required. These elements are merely marks for allowing easy and quick detection of vertical and horizontal data sampling positions of an encoded image in the control circuit unit 2 which performs hardware processing in real time. In place of the specific patterns, the black/white boundary rule may be utilized to identify the black/white level of each dot by the CPU 4. For example, a frame of encoded image data is scanned in the vertical and horizontal directions to extract a boundary point of black and white pixels, thus recognizing vertical and horizontal lines forming dots of the mesh pattern. The central points of adjacent vertical lines and the central points of the adjacent horizontal lines are calculated to obtain sampling coordinates of each dot. Image data located at the calculated coordinates can be sampled to recognize a black/white level of each dot.

In the above embodiment, 1 bit is encoded using four types of black-and-white patterns each of four dots, and each of bit "0" and bit "1" includes two patterns. Alternatively, a single pattern may be assigned to each of bit "0" and bit "1". For example, a pattern shown in FIG. 15D may be used as bit "0", and a pattern shown in FIG. 15E may be used as bit "1". In this case, a maximum number of successive bits having the same lightness is 2 in the mesh pattern. The number of dots representing 1 bit is not limited to 4, and 1 bit may be expressed by a plurality of dots excluding 4. For example, when a 1-bit encoded image is constituted by three dots, a pattern in which the upper left dot is black and the upper right and lower left dots are white or a pattern obtained by rotating this pattern by 180° may be used as bit "1", and a pattern in which the upper left dot is white and the upper right and lower left dots are black or a pattern obtained by rotating this pattern by 180° may be used as bit "1". In this case, a 1-bit encoded image having no upper left dot (three dots, i.e., lower right, upper right, and lower left) can be coupled under a 1-bit encoded image having no lower right dot (three dots, i.e., upper left, upper right, and lower left). A 1-bit encoded image having no lower right dot has black/white boundaries between the upper left and upper right dots and between the upper left and lower left dots. A 1-bit encoded image including no upper left dot has black/white boundaries between the lower right and lower left dots and between the lower right and upper right dots. Therefore, black/white boundaries are regularly present in the mesh pattern. 1-bit encoded images preferably have different black-and-white patterns from each other as much as possible. In such a case, even when many errors are included upon recognition of black/white levels of a plurality dots, bits which are likely to be correct can be decoded.

In the data reading apparatus of this embodiment, image sensor means reads an image on the data recording medium, dot state identification means identifies a black/white level of each dot of the mesh pattern, and data decoding means compares a black-and-white pattern identified by the dot state identification means with a predetermined reference pattern, thus decoding data. Black/white boundaries are almost uniformly distributed in the mesh pattern. For this reason, the image sensor means does not successively receive identical black/white data, and a black/white recognition rate of each dot by the dot state identification means can be improved. Furthermore, since each 1-bit encoded image is expressed by a black-and-white pattern of a plurality of dots, even if black/white levels of some dots are erroneously recognized, the data decoding means can estimate a bit which is likely to be correct, thus improving a data recognition rate.

(Third Embodiment)

A third embodiment of the present invention will now be described.

The feature of the third embodiment is to provide a recording apparatus with which a user records a mesh pattern, while the first and second embodiments relate to a reading apparatus for reading data from a recording medium on which a mesh pattern is recorded.

For example, as an encoded image recorded on a data recording medium like in the second embodiment, a mesh pattern in which each 1-bit encoded image is constituted by a black-and-white pattern of a predetermined number of dots, and boundaries between black and white dots are regularly distributed is employed. The encoded image i recorded on a data recording medium using a binary data recording apparatus, and binary data is reproduced from the encoded image using a binary data recording/reproducing apparatus.

In this case, the reading apparatus DR shown in FIG. 1 is replaced with a binary data recording/reproducing apparatus. The binary data recording/reproducing apparatus DR serves as an I/0 device of performance data for an electronic musical instrument MI. When data is input, performance data is transferred from the apparatus DR to the musical instrument MI. When data is output, performance data is transferred from the musical instrument MI to the apparatus DR.

Figure 18:
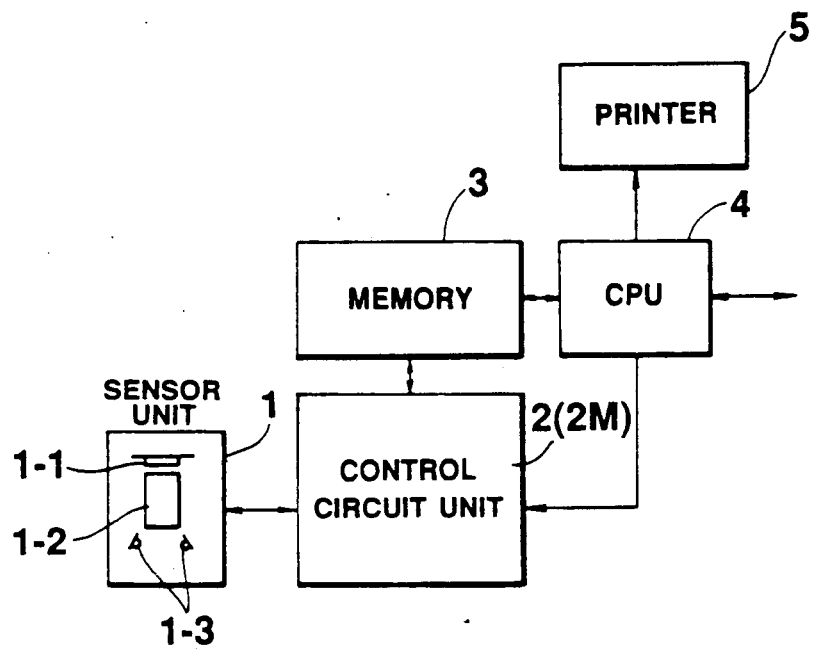
FIG. 18 is a block diagram of a binary data recording apparatus for recording/reproducing an encoded image according to a third embodiment of the present invention.

FIG. 18 is a block diagram of the binary data recording/reproducing apparatus DR for recording an encoded image on a data recording medium such as a paper sheet (in FIG. 1, a margin of the music score S), and reproducing binary data from the recorded encoded image. In a recording mode, binary data supplied from an external apparatus (in FIG. 1, an electronic musical instrument) is encoded by a CPU 4, and is printed on the data recording medium. In a reproducing mode, image data on the data recording medium is read by a sensor unit 1, black/white levels of dots of a mesh pattern MP are identified by a control circuit unit 2, and the identified data are temporarily stored in a memory 3. The data stored in the memory 3 are decoded into binary data by the CPU 4, and the decoded data are transferred to the external apparatus.

Figure 19A:
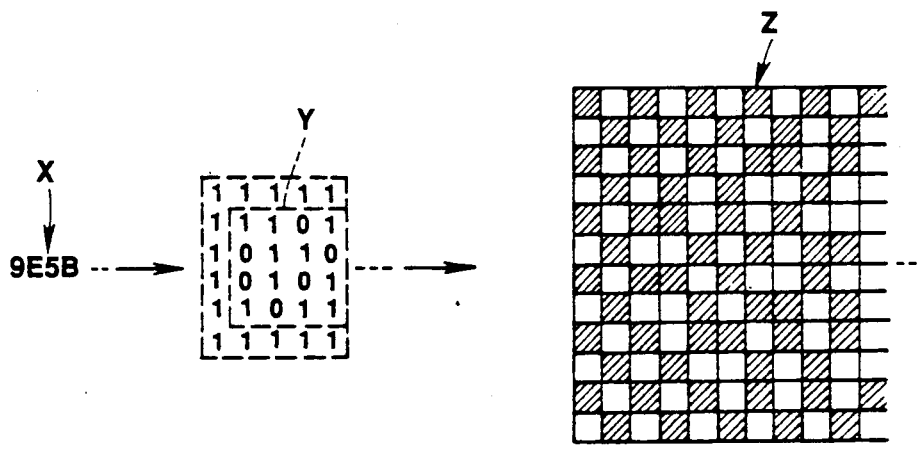
FIG. 19A is a view for explaining data encoding states executed by a CPU in a recording mode.

Encoding processing executed by the CPU 4 in the recording mode will be described below with reference to FIGS. 19A to 19C. In the following description, starting 16 bits of binary data to be encoded are "9E5B" (hexadecimal notation) (X in FIG. 19A). A two-dimensional bit pattern of the binary data "9E5B" is indicated by Y in FIG. 19A. Starting four bits are arranged in the first column of the bit pattern, and following sets of four bits are sequentially arranged in right columns. The bit pattern Y is surrounded by bits "1". This corresponds to a pattern in which two rows at each of the upper and lower ends and two columns at the left end of the mesh pattern MP form specific pattern in the encoded image shown in FIG. 16. The mesh pattern MP (indicated by Z in FIG. 19A) and the bit pattern have the relationship that one bit is expressed by four (2×2) black/white dots (1-bit encoded image). Black/white boundaries must be formed at right and left sides of each 1-bit encoded image. An operation for converting a bit pattern into a black-and-white pattern will be described below with reference to the flow chart show in FIG. 19B.

In step 5-1, the CPU 4 writes $$\begin{pmatrix} 10 \\ 01 \end{pmatrix}$$

six times in the vertical direction in a print buffer in a printer 5. This corresponds to the pattern at the left end of the mesh pattern MP in FIG. 16. In step 5-2, the CPU 4 writes $$\begin{pmatrix} 10 \\ 01 \end{pmatrix}$$

correspnoding to 1-bit encoded image at the upper end in the print buffer. Thereafter, the CPU 4 repeats the processing in steps 5-3 to 5-9 four times, thus forming data for 4-bit encoded images in the present column. More specifically, in order to generate data corresponding to a 1-bit encoded image, the CPU 4 extracts data a (FIG. 19C) indicating a black/white level of a right neighboring dot of the upper left dot of this 1-bit encoded image from already converted data, and checks in step 5-3 if the extracted data is "1" (black) or "0" (white). If the data a is "1", the flow advances to step 5-4 to check if one bit of binary data to be presently converted is bit "1" or "1". When an encoded image representing bit "1" is coupled to the left side of the pattern shown in FIG. 15B or 15D, the pattern shown in FIG. 15D must be selected. When an encoded image representing bit "0" is coupled, the pattern shown in FIG. 15C must be selected. Therefore, if one bit of binary data to be converted to an image is "1", the CPU 4 writes $$\begin{pmatrix} 01 \\ 10 \end{pmatrix}$$

in step 5-5; if the bit is "0", it writes $$\begin{pmatrix} 00 \\ 11 \end{pmatrix}$$

in step 5-6. If it is determined in step 5-3 that a=0, the flow advances to step 5-7 to check a value of a bit to be converted. On the right side of the pattern shown in FIG. 15C or 15E, the pattern shown in FIG. 15E must be recorded for bit "1", or the pattern shown in FIG. 15B must be recorded for bit "0". Therefore, if the bit to be converted is "1", the flow advances to step 5-8 and $$\begin{pmatrix} 10 \\ 01 \end{pmatrix}$$

is written in the print buffer; if it is "0", the flow advances to step 5-9 and $$\begin{pmatrix} 11 \\ 00 \end{pmatrix}$$

is written in the print buffer.

If convertion for four bits of binary data corresponding to one column is completed, the flow advances to step 5-10, and $$\begin{pmatrix} 10 \\ 01 \end{pmatrix}$$

corresponding to a 1-bit encoded image at the lower end is written in the print buffer. The flow then advances to step 5-11 to check if conversion for all the binary data is completed. If NO in step 5-11, the flow returns to step 5-2 for data conversion of the next column. If it is determined in step 5-11 that conversion for all the data is completed, encoded data representing black/white levels of dots of the mesh pattern MP are completed on the print buffer. A stored position (address) on the print buffer represents a position of each dot when dots are two-dimensionally recorded on the data recording medium.

Thereafter, bits of the encoded data stored in the print buffer can be recorded as dots on the data recording medium by the printer 5. For example, if the bit of the encoded data is "1", a black dot is printed; if it is bit "0", one dot is subjected to space processing (when a mesh pattern is recorded on a data recording medium with a white background color). Every time one dot is recorded, the printer 5 shifts a printing position in accordance with the address of the encoded data, thus printing the two-dimensional mesh pattern MP. Note that the upper and lower bars A-1 and A-2 have not been described. However, since these bars are simple patterns having a predetermined positional relationship with the mesh pattern MP, they can be easily printed.

In a reproducing mode, image data on the data recording medium is read by the sensor unit 1, and binary data is reproduced by the control circuit unit 2 and the CPU 4. Conversion process from image data to binary data is constructed two steps. In the first step, black/white levels of dots in the mesh pattern MP are recognized based on image data. In the second step, black/white data of four recognized dots are decoded to bits of binary data. The processing in the first step is performed by the control circuit unit 2, and the processing in the second step is performed by the CPU 4.

These processing operations are the same as those already described in the second embodiment, and a description thereof will be omitted.

(Modification)

The present invention is not limited to the above embodiment, and various changes and modifications may be made.

For example, in this apparatus, a recording apparatus and a reproducing apparatus may be constituted as separate units.

In the above embodiment, a black/white level of each dot is identified by the control circuit unit 2 as the hardware means. However, the identification operation may be executed by the CPU 4 if a decrease in recognition speed does not pose a problem. In association with this, specific patterns at the ends of the encoded image EI and the upper and lower bars A-1 and A-2 are not always required. These elements are merely marks for allowing easy and quick detection of vertical and horizontal data sampling positions of an encoded image in the control circuit unit which performs hardware processing in real time. In place of the specific patterns, the black/white boundary rule may be utilized to identify the black/white level of each dot by the CPU 4. For example, a frame of encoded image data is scanned in the vertical and horizontal directions to extract a boundary point of black and white pixels, thus recognizing vertical and horizontal lines forming dots of the mesh pattern. The central points of adjacent vertical lines and the central points of the adjacent horizontal lines are calculated to obtain sampling coordinates of each dot. Image data located at the calculated coordinates can be sampled to recognize a black/white level of each dot.

In the above embodiment, 1 bit is encoded using four types of black-and-white patterns each of four dots, and each of bit "0" and bit "1" includes two patterns. Alternatively, a single pattern may be assigned to each of bit "0" and bit "1". For example, a pattern shown in FIG. 15D may be used as bit "0", and a pattern shown in FIG. 15E may be used as bit "1". In this case, a maximum number of successive bits having the same lightness is 2 in the mesh pattern. When a single image pattern is assigned to each of bit "0" and bit "1", a pattern can be selected on the basis of only a value of a bit in encoding processing in the recording mode.

The number of dots representing 1 bit is not limited to 4, and 1 bit may be expressed by a plurality of dots excluding 4. For example, when a 1-bit encoded image is constituted by three dots, a pattern in which the upper left dot is black and the upper right and lower left dots are white or a pattern obtained by rotating this pattern by 180° may be used as bit "1", and a pattern in which the upper left dot is white and the upper right and lower left dots are black or a pattern obtained by rotating this pattern by 180° may be used as bit "1". In this case, a 1-bit encoded image having no upper left dot (three dots, i.e., lower right, upper right, and lower left) can be coupled under a 1-bit encoded image having no lower right dot (three dots, i.e., upper left, upper right, and lower left). A 1-bit encoded image having no lower right dot has black/white boundaries between the upper left and upper right dots and between the upper left and lower left dots. A 1-bit encoded image including no upper left dot has black/white boundaries between the lower right and lower left dots and between the lower right and upper right dots. Therefore, black/white boundaries are regularly present in the mesh pattern. 1-bit encoded images preferably have different black-and-white patterns from each other as much as possible. In such a case, even when many errors are included upon recognition of black/white levels of a plurality of dots, bits which are likely to be correct can be decoded.

In an extreme case, one bit can be expressed and encoded by one dot. In this case, the same technique as in the first embodiment can be employed.

According to this embodiment, in reproduction of binary data, when image data is read, input black/white levels of dots can be reliably binarized due to the regularly present boundaries. The black/white levels of dots can be identified at a high recognition rate. Furthermore, since the identified black-and-white pattern is compared with a predetermined pattern, even if the black-and-white pattern includes recognition errors of black/white levels of dots, a bit which is likely to be correct can be decoded, thus improving a reproduction rate. Therefore, a printing precision in the binary data recording apparatus can be low relative to a recording density.

As a result, in this embodiment, information having a relatively high density can be recorded on an inexpensive data recording medium such as a paper sheet. According to the binary data recording/reproducing apparatus of this embodiment, a large volume of information can be stocked and exchanged through an inexpensive data recording medium.

(Fourth Embodiment)

A fourth embodiment of the present invention will be described below. The characteristic feature of the fourth embodiment is an improvement of a circuit arrangement used when an encoded image is read and binarized.

According to this embodiment, an average value of analog signals of an image for one scan line from an image sensor is calculated, and analog signals of an image for the next line are binarized using this average value as a threshold level. Therefore, when a density of an image on a recording medium varies, binary data of an image can be read according to the variation.

Figure 20:
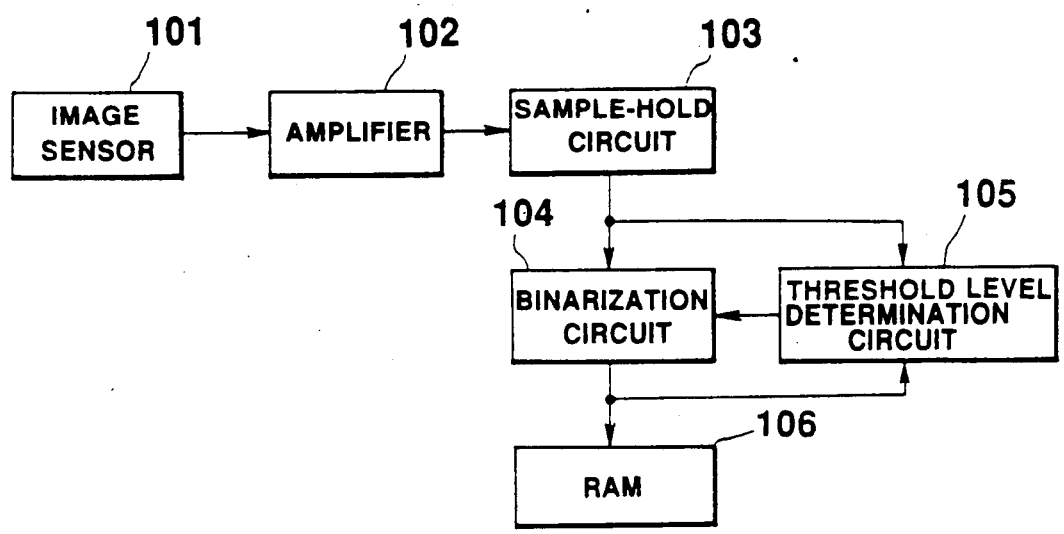
FIG. 20 is a block diagram showing the overall arrangement of a data reading apparatus according to a fourth embodiment of the present invention.

FIG. 20 shows the overall arrangement of a data reading apparatus according to this embodiment An image sensor 101 converts an encoded image (FIG. 21) on a recording medium into analog electrical signals, and serially supplies them to an amplifier 102 in units of scan lines. The analog electrical signals amplified by the amplifier 102 are sent to a sample-hold circuit 103 to be periodically sampled and held. The analog electrical signals from the sample-hold circuit 103 are supplied to a binarization circuit 104 and a threshold level determination circuit 105. The binarization circuit 104 binarizes the analog electrical signals using a threshold level determined by the threshold level determination circuit 105 in units of lines. The binarized digital signals are written in a RAM 106, and are sent to the threshold level determination circuit 105 so as to determine the threshold level for the next line.

Figure 21:
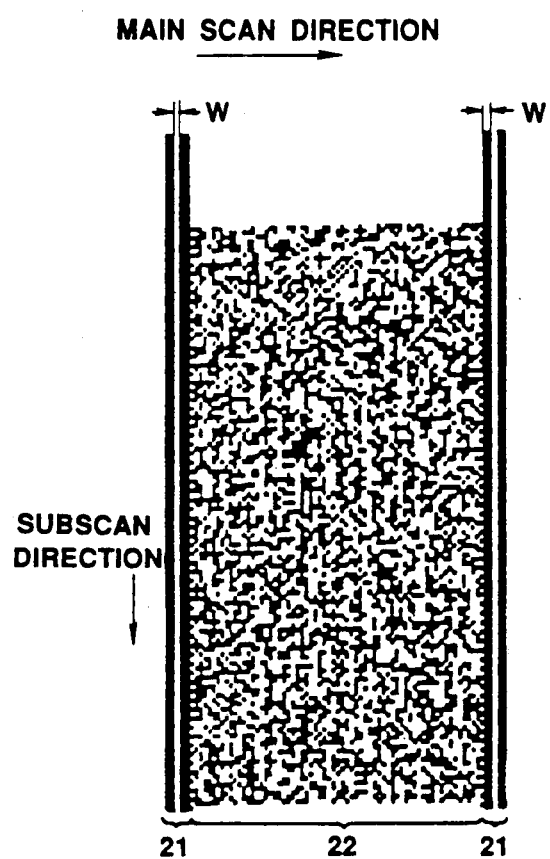
FIG. 21 is a view showing an encoded image recorded on a recording medium.

FIG. 21 shows an example of an encoded image recorded on a recording medium. The encoded image is constituted by known patterns and a data body. In FIG. 21, the known patterns are constituted by black and white bars 21 extending along a sub-scan direction of an image. Widths w of the white and black bars along the main scan direction are equal to each other. Therefore, a ratio of widths of the white and black bars is 1. More specifically, each bar 21 is constituted by two black bars and a blank portion sandwiched therebetween. The bars 21 are formed at two sides of an area of a data body 22. In the data body 22, black pixels which are to be decoded as "1" and white pixels which are to be decoded as "0" are distributed.

Figure 22:
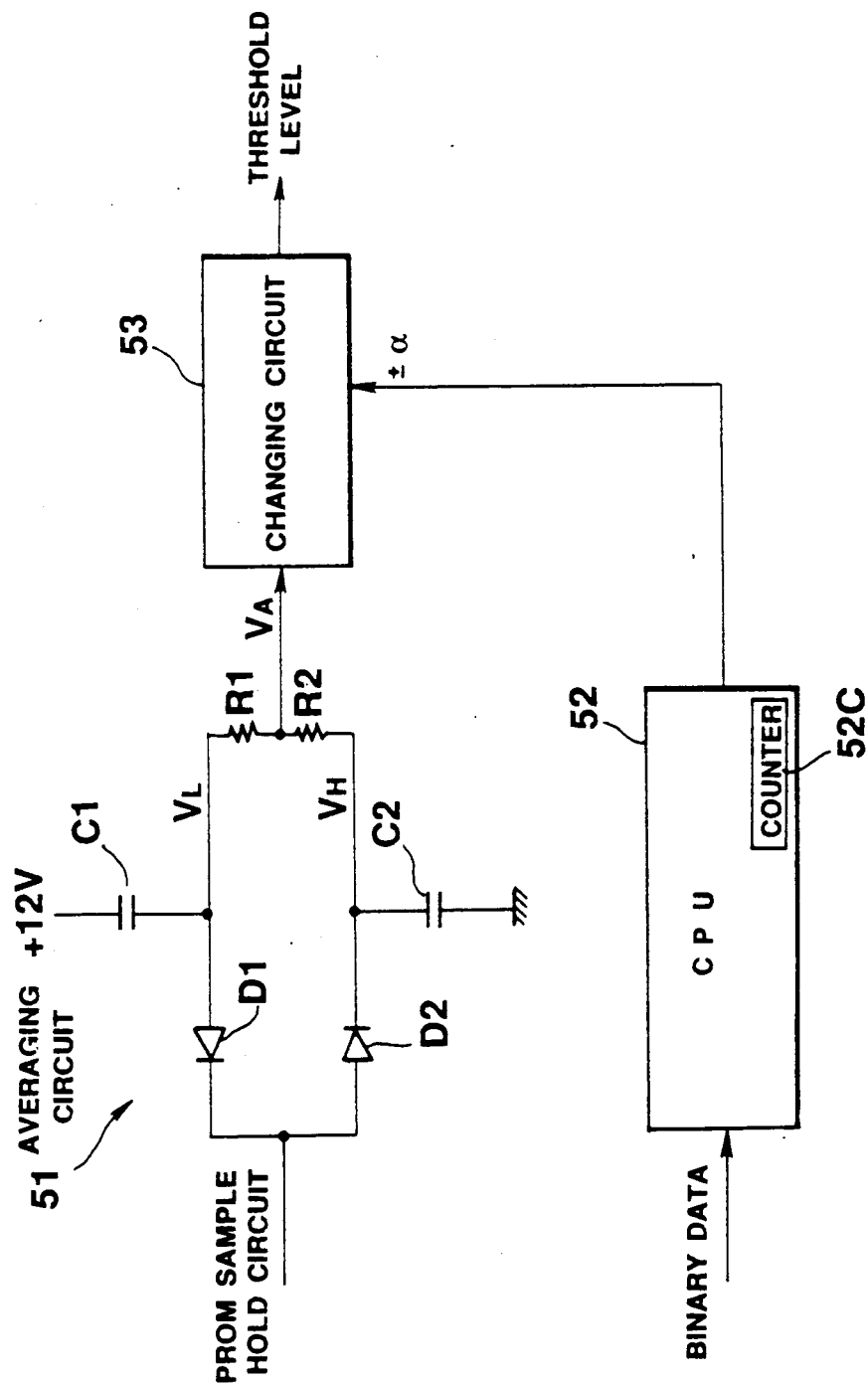
FIG. 22 is a circuit diagram of a threshold determining circuit.

FIG. 22 shows the arrangement of the threshold level determination circuit 105. An averaging circuit 51 calculates an average value of analog electrical signals (sensor outputs) supplied from the sample-hold circuit 103. More specifically, the averaging circuit 51 is constituted by a capacitor C1 one end of which is connected to a positive voltage source (12 V); a diode D1 the cathode of which is connected to the output terminal of the sample-hold circuit 103; a capacitor C2 one end of which is grounded; a diode D2 the cathode of which is connected to the other end of the capacitor C2 and the anode of which is connected to the output of the sample-hold circuit 103; and a voltage divider having resistors R1 and R2 (having equal resistances R1=R2) for equally dividing a voltage $V_L$ appearing at the other end of the capacitor C1 and a voltage $V_H$ appearing at the other end of the capacitor C2 to generate a voltage $V_A=(V_L+V_H)/2$. The voltage $V_L$ of the capacitor C1 represents a voltage of a minimum level of the outputs of the sensor 101, i.e., a voltage corresponding to a darkest pixel, the voltage $V_H$ of the capacitor C2 represents a voltage of a maximum level of the outputs of the sensor 101, i.e., a voltage corresponding to a brightest pixel, and the output voltage $V_A$ represents an average value between these voltages. The average value voltage $V_A$ is supplied to the binarization circuit through a changing circuit 53 as an initial value of the threshold level. A CPU 52 checks binary data supplied from the binarization circuit 104 in units of scan lines, and counts the number of pixels representing the widths 2w of the two bars, and the number of pixels representing the widths 2w of the two blank portions using a counter 52c to compare them. As shown in FIG. 21, the width of the black bar is equal to that of the blank portion. Therefore, if it is determined that the width of the black bar is larger, this indicates that the threshold level is too high. If it is determined that the width of the blank portion is larger, this indicates that the threshold level is too low. Therefore, the CPU 52 generates data ±α representing an amount to be changed of the threshold level in accordance with the comparison result of the ratio of widths, and supplies it to the changing circuit 53. The changing circuit 53 adds/subtracts the data α from the CPU 52 to/from the present value of the threshold value to calculate a new threshold level. The new threshold level is used for binarizing analog electrical signals for the next image line in the binarizing circuit 104.

FIGS. 23A to 23F are timing charts of signals used in the respective sections of FIG. 20. A scan start signal a shown in FIG. 23A is output from a switch of the image sensor 101 upon starting of scanning of an image. An address reset signal b shown in FIG. 23B is a main scan start pulse, and goes to low level at the begining of serial outputting of analog electrical signals for one scan line read in the main scan period. A signal c in FIG. 23C is a clock for defining a data read timing, and is output from the image sensor 101 during the main scan period. Signals d in FIG. 23D are analog electrical signals serially output from the image sensor 101. The signals are sampled by the sample-hold circuit 103 at the trailing edge of the clock c (excluding a low-active period of the address reset signal b). Signals e shown in FIG. 23E are image analog electrical signals sampled and held by the sample-hold circuit 103. FIG. 23F shows digital signals f obtained by binarizing the signals e.

As can be seen from these timing charts, the image analog electrical signals for one main scan line include information of the corresponding portions of the bars 21. Therefore, when these signals are binarized, the widths of the bars 21 can be evaluated by obtaining run lengths of black and white pixels. If the ratio of the evaluated widths does not coincide with the known ratio of the widths of bars, the threshold level can be corrected to obtain a coincidence.

Figure 24:
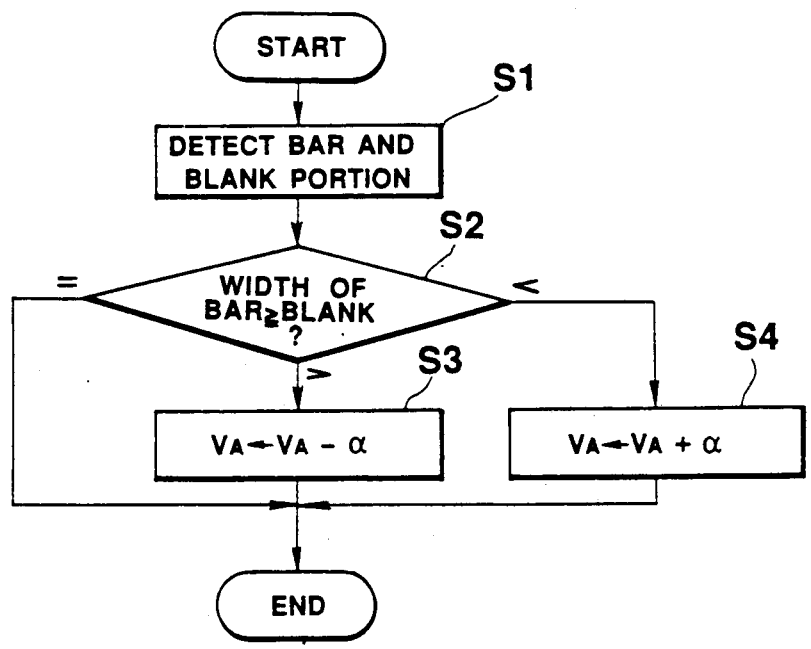
FIG. 24 is a flow chart showing processing for changing a threshold level on the basis of a binarization result.

FIG. 24 is a flow chart of threshold level changing processing. In step S1, the width of the black bar and the width of the blank portion are detected from the binary data of an image for one main scan line. In step S2, the detected widths are compared with each other. If these widths are equal to each other, since the threshold level is at a proper level, the value is maintained. If the width of the black bar is larger, this is caused by too high a threshold level. Thus, the threshold level is decreased by c (step S3). If the width of the black bar is smaller, this is caused by too low a threshold level. Thus, the threshold level is increased by $\alpha$ (step S4). The threshold level $V_A$ changed in this manner is used as a threshold value for binarizing image analog signals for the next main scan line.

(Modification)

Various changes and modifications of this embodiment may be made. For example, in the above embodiment, the output of the averaging circuit 51 is used as only the initial value of the threshold level. A threshold level for the entire image can be obtained on the basis of only the output of the averaging circuit 51. The averaging circuit 51 detects the voltages $V_H$ and $V_L$ to follow a sub-scan operation. For this reason, the average value signal $V_A$ of the voltages $V_H$ and $V_L$ is changed to follow a print density which varies depending on positions on the recording medium, thus obtaining a desired threshold level. In this arrangement, the known pattern need not be included in the image data, and data can be read at high speed with a simple arrangement. Contrary to this, the threshold level may be variably controlled so that a ratio of measured values of white and black bars always coincides with an actual ratio by utilizing only bars as the known patterns. An approach for correcting the threshold level to cause it to coincide with the known patterns allows more accurate data reading as compared to an arrangement for changing a threshold level based on an average value. A reference pattern for correcting the threshold level is not limited to patterns having a known width ratio. For example, a single bar whose width is known or marks each having a known size scattered in an image may be used (when an image is scanned in a predetermined direction).

According to this embodiment, known reference patterns are distributed in an image to be recorded on a recording medium, and a threshold level for binarization is automatically changed so that the binarized data includes pattern data which coincides with the reference pattern. Therefore, accurate data reading can be performed regardless of recording quality of the recording medium.

In this embodiment, an image includes patterns which have a predetermined ratio of widths of black and white bars, and an average value of image analog electrical signals obtained by averaging means is used as an initial value of the threshold level to binarize the image analog electrical signals. Every time signals for one scan line are binarized, the ratio of the widths of the black and white bars included in the binary data is measured, and the threshold level is corrected in accordance with the measurement result. For this reason, even when a scanning direction of an image is varied during an operation, accurate binarization can be performed.

Some embodiments of the present invention have been described. According to the present invention, the techniques of these embodiments may be combined to realize various arrangements, and various changes and applications may be made on the basis of these embodiments.

What is claimed is:

1. A data reading apparatus comprising:
   image sensor means for reading an image formed on a recording medium, the image including a mesh pattern comprising a plurality of dark and light areas on said recording medium which represents a block of encoded data as well as first indicia comprising a pair of bars formed along upper and lower sides of said mesh pattern for indicating a vertical data sampling position of said mesh pattern and second indicia comprising a boundary line between horizontally adjacent dark and light areas included in said mesh pattern for indicating a horizontal data sampling position of said mesh pattern;
   said image sensor means including means for reading said image from one side toward the other side of said mesh pattern in units of scan lines, substantially in a vertical direction;
   vertical sampling position calculating circuit means for detecting said first indicia from data of the image read by said image sensor means to calculate the vertical data sampling position;
   said vertical sampling position calculating circuit means comprising interval measuring circuit means for measuring an interval between said pair of bars, and dividing circuit means for substantially equally dividing the interval of said pair of bars measured by said interval measuring circuit means to calculate the vertical data sampling positions;
   horizontal sampling position calculating circuit means for detecting said second indicia from data of the image read by said image sensor means and for calculating the horizontal data sampling position of said mesh pattern;
   said horizontal sampling position calculating circuit means comprising dark and light area boundary detecting circuit means for detecting said boundary line, and circuit means for detecting a time corresponding to a lapse of a predetermined period of time from detection of the boundary line by said dark and light area boundary detecting circuit means for determining the horizontal data sampling position;
   data sampling circuit means for sampling data of the image at data sampling coordinates defined by the vertical and horizontal data sapling positions calculated by said vertical sampling position calculating circuit means and said horizontal sampling position calculating circuit means.

2. A data reading apparatus according to claim 1 in which the dark and light areas in said image are respectively black and white dots.

3. A data reading apparatus comprising:
   image sensor means for reading an image formed on a recording medium from one side toward the other side of a mesh pattern included in the recorded image in units of lines in a vertical direction, said mesh pattern having a rectangular shape as a whole and being obtained by encoding a block of data by selectively formed dark and light areas, and the image including first indicia for indicating a vertical data sampling position of said mesh pattern and second indicia for indicating a boundary position of horizontally adjacent dark and light areas of said mesh pattern;
   vertical sampling position calculating circuit means for detecting said first indicia from data of the image read by said image sensor means to calculate the vertical data sampling position;

boundary position detecting circuit means for detecting said second indicia from data of the image read by said image sensor means to calculate the boundary position;

horizontal speed detecting circuit means for determining the horizontal scanning speed of said mesh pattern;

horizontal sampling position calculating means for calculating the horizontal data sampling position of said mesh pattern on the basis of the boundary position determined by said boundary position detecting circuit means and the scanning speed detected by said horizontal speed detecting circuit means; and data sampling circuit means for sampling data of the image at data sampling coordinates defined by the vertical and horizontal data sampling positions calculated by said vertical sampling position calculating circuit means and said horizontal sampling position calculating means.

4. A data reading apparatus according to claim 3 in which the dark and light areas are respectively black and white dots.

5. A data reading apparatus comprising:

image sensor means for reading an image formed on a recording medium from one side toward the other side of a mesh pattern included in the image in units of lines in a vertical direction, said mesh pattern having a rectangular shape as a whole and being obtained by encoding a block of data by selectively forming dark and light areas in said pattern, the image including indicia for indicating a vertical data sampling position of said mesh pattern, and at least a row of dark and light area of said mesh pattern constituting a specific pattern in which dark and light areas alternately appear;

vertical sampling position calculating circuit means for detecting said indicia from data of the image read by said image sensor means to calculate the vertical data sampling positions of dark and light areas of said mesh pattern;

boundary detecting circuit means for detecting a boundary between adjacent dark and light areas in each row in said mesh pattern from the data of the image read by said image sensor means;

specific boundary detecting circuit means for detecting a boundary of adjacent dark and light areas in said specific pattern from the data of the image read by said image sensor means;

horizontal scanning speed detecting circuit means for measuring a time from detection of the boundary by said specific boundary detecting circuit means to detection of the next boundary for determining the horizontal scanning speed of said mesh pattern;

horizontal sampling position calculating means for calculating the horizontal data sampling positions of the dark and light areas of said mesh pattern by determining the time at which said boundary detecting circuit means detects the boundary and the horizontal scanning speed is detected by said horizontal scanning speed detecting circuit means; and data sampling circuit means for sampling data of the image at data sampling coordinates of the dark and light areas defined by the vertical and horizontal data sampling positions calculated by said vertical sampling position calculating circuit means and said horizontal sampling position calculating means.

6. A data reading apparatus according to claim 5 in which the dark and light areas are black and white.

* * * * *

UNITED STATES PATENT AND TRADEMARK OFFICE
CERTIFICATE OF CORRECTION

PATENT NO.  : 5,042,079
DATED       : August 20, 1991
INVENTOR(S) : S. MORIKAWA

It is certified that error appears in the above-identified patent and that said Letters Patent is hereby corrected as shown below:

Title page, Section [75] Inventors - Delete the names of the following inventors:

Takeshi MATSUOKA and Hiroshi CHIKAKIYO

Signed and Sealed this

Third Day of May, 1994

Attest:

BRUCE LEHMAN

Attesting Officer          Commissioner of Patents and Trademarks